United States Patent [19]

Galdun et al.

[11] Patent Number: 4,527,250
[45] Date of Patent: Jul. 2, 1985

[54] VIDEO COMPUTER TERMINAL WITH DETACHABLE INTELLIGENT KEYBOARD MODULE

[75] Inventors: Daniel J. Galdun, Huntsburg; Odo J. Struger, Chagrin Falls; Valdis Grants, Lyndhurst; Ronald A. Brown, Willowick, all of Ohio

[73] Assignee: Allen-Bradley Company, Milwaukee, Wis.

[21] Appl. No.: 490,740

[22] Filed: May 9, 1983

Related U.S. Application Data

[63] Continuation of Ser. No. 186,254, Sep. 11, 1980, which is a continuation-in-part of Ser. No. 75,176, Sep. 12, 1979, abandoned.

[51] Int. Cl.³ .................. G06F 3/023; G06F 3/153
[52] U.S. Cl. .................................................. 364/900
[58] Field of Search ... 364/200 MS File, 900 MS File, 364/189; 340/711, 712

[56] References Cited

U.S. PATENT DOCUMENTS

| | | | |
|---|---|---|---|
| 3,573,749 | 4/1971 | Smith et al. | 364/900 |
| 3,605,285 | 9/1971 | Bendaniel et al. | 369/33 X |
| 3,971,925 | 7/1976 | Wenninger et al. | 364/900 |
| 4,107,784 | 8/1978 | Van Bemmelen | 364/900 |
| 4,156,928 | 5/1979 | Inose et al. | 364/900 |
| 4,202,041 | 5/1980 | Kaplow et al. | 364/900 |
| 4,279,021 | 7/1981 | See et al. | 364/900 |

*Primary Examiner*—Thomas M. Heckler
*Attorney, Agent, or Firm*—Quarles & Brady

[57] ABSTRACT

An interchangeable keyboard application module is connected to a video monitor module in a computer terminal to provide sequences of processor instructions and a keyboard for performing a plurality of selectable applications. The video monitor module includes a CRT display, a serial I/O interface and a processor that processes characters received through the serial I/O interface for display on the CRT screen whether or not the application module is attached. The processor in the video monitor module detects the connection of the application module, and then selects its instructions from a memory in the application module first, to prompt the selection of a mode of operation for the terminal, and second to execute the selected mode of operation. The application module uses a plurality of keyboard overlays, each corresponding to a respective mode of operation. In a specific embodiment two of the modes of operation are programming applications related to programmable controllers.

11 Claims, 18 Drawing Figures

Microfiche Appendix Included
(12 Microfiche, 576 Pages)

4,527,250

VIDEO COMPUTER TERMINAL WITH DETACHABLE INTELLIGENT KEYBOARD MODULE

CROSS-REFERENCE TO RELATED APPLICATION

This is a continuation of a copending U.S. Pat. application of Galdun et al, Ser. No. 186,254, filed Sep. 11, 1980, which is a continuation-in-part of a copending U.S. patent application of Galdun et al, Ser. No. 75,176 filed Sep. 12, 1979, and now abandoned.

REFERENCE TO MICROFICHE APPENDIX

Incorporated herein are microfiche appendices consisting of twelve microfiche cards. A table of contents listing these appendices is set out in Table 4 at the end of the detailed description.

BACKGROUND OF THE INVENTION

1. Field of the Invention

The field of the invention is computer terminals, and particularly, terminals which include a keyboard for entering information into a digital system and a display for visually displaying the information to an operator.

2. Description of the Prior Art

A general purpose computer terminal of the type well known in the art typically has a data link for receiving data from a computer, a cathode ray tube (CRT) display unit for visually displaying the data to an operator, and a keyboard for manually entering data into the system. The keyboard is usually general purpose in construction, containing standard typewriter keys and perhaps a separate numeric keyboard.

In recent years microprocessors have been employed to carry out the functions of driving the CRT, monitoring the keyboard and controlling communications through the data link. In such microprocessor-based terminals, the microprocessor may be programmed for special functions which allow the terminal to perform limited data processing or word processing functions. Similar to the devices disclosed in U.S. Pat. Nos. 4,028,538 and 3,971,925 such "smart" terminals can be programmed by the operator, using magnetic tape cartridges or modules containing read-only memories, to perform special functions. Commands can then be entered through the keyboard to carry out these special functions. When a general purpose keyboard is employed such commands are directed by selecting one or more keys marked with the standard keyboard characters and this places a burden on the operator to learn a code for these commands. To overcome this problem, some manufacturers provide blank function keys on the keyboard to which the operator can attach symbols which represent the commands, and others, as illustrated in U.S. Pat. Nos. 3,971,925 and 4,156,928 provide separate keyboard modules.

SUMMARY OF THE INVENTION

The present invention is a universal industrial terminal which may be programmed to perform general purpose computer terminal functions or special application functions, such as loading and editing programs for various types of programmable controllers and numerical control systems.

The invention provides an application module which is removably connected to the computer terminal and which includes a keyboard, a keyboard overlay disposed over the keyboard with a plurality of keyboard symbols each disposed over a respective key, an application memory for storing instructions that interpret keyboard inputs according to the set of symbols represented on the overlay, and interface means for coupling the application memory and the keyboard to a controller portion of the industrial terminal.

The controller portion of the terminal includes a CRT display unit and a serial I/0 interface means for coupling data to and from a serial I/0 channel. The controller portion of the terminal also has a resident memory for storing a plurality of resident firmware instructions. These instructions are executed by a main processor in the controller portion of the terminal to determine whether an application module is connected and to switch the main processor to execute the instructions stored on the application module.

The "personality" of each interchangeable application module is determined by the instructions in the application memory. An application memory of sufficient size for storing instructions for more than one application is provided; however, each application has its own set of keyboard symbols, and consequently its own keyboard overlay.

A particular aspect of the present invention is the application of the industrial terminal to emulate a program panel for two distinct programmable controllers. An application module is programmed for both program loading applications and a general purpose application. An interchangeable keyboard overlay is provided for each application, and when the desired overlay is in place, the particular application can be selected by operating a mode select key and entering a code number through the keyboard. Thus, the industrial terminal is a general purpose peripheral unit that is quickly adapted to operate as a special purpose unit. The industrial terminal is therefore applicable to a large number of programmable devices, including those still being developed. When an application module is not connected to the controller portion of the terminal, it acts as a general purpose CRT monitor for receiving messages through a serial channel and displaying them on the CRT screen.

Another aspect of the invention is the programming of the terminal to provide prompt messages and menus of various options to be selected by the user. Thus the operator is not required to memorize codes for the various operating modes and options.

It is one object of the invention to provide a removable keyboard application module including both a keyboard and a memory for storing processor instructions for carrying out the commands entered through the keyboard.

It is another object of the invention to provide a CRT monitor when the application module is not connected.

It is another object of the invention to provide sets of processor instructions on the keyboard module for different modes of operation, and a plurality of interchangeable overlays, where each overlay provides the command symbols for a respective mode of operation.

It is another object of the invention to provide a mode selection sequence in a memory within the controller to assist the user of the terminal in selecting a mode of operation.

It is another object of the invention to provide connectors to the keyboard and application memory in an interface between the application module and the controller.

It is another object of the invention to provide a terminal that includes a program panel for two different types of programmable controllers.

It is another object of the invention to assist the operator in selecting certain communication options when the terminal is being operated in a general purpose mode of operation.

The foregoing and other objects and advantages of the invention will appear from the following description, in which reference is made to the accompanying drawings that form a part hereof and show a preferred embodiment of the invention. Such embodiment does not necessarily represent the full scope of the invention, however, as such scope has been provided by the appended claims.

DETAILED DESCRIPTION OF THE PREFERRED EMBODIMENT

Figure 1:
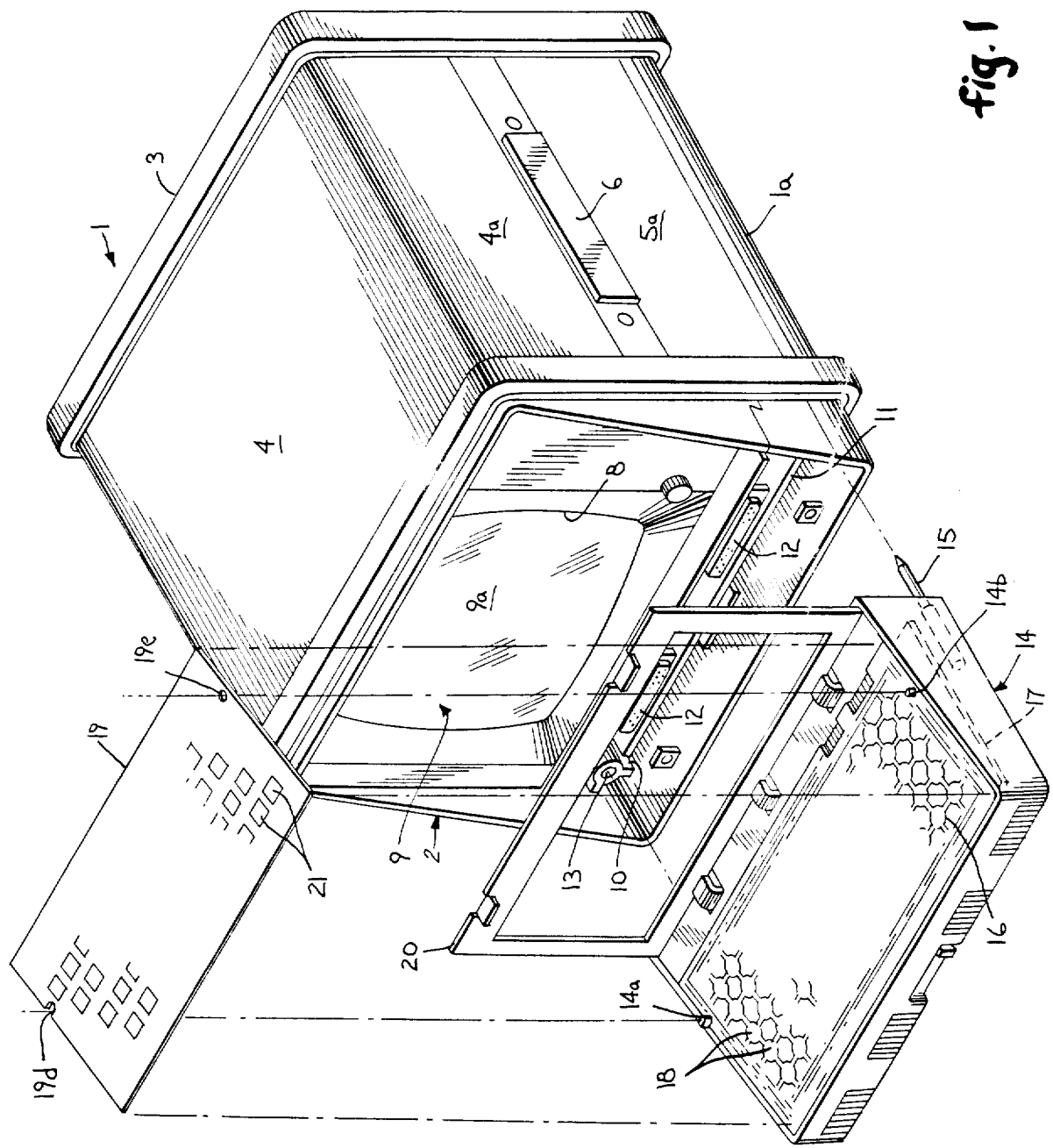
FIG. 1 is a partially exploded perspective view of a preferred embodiment of the industrial terminal of the present invention.

Referring to FIG. 1, a controller module 1a for an industrial terminal 1 that incorporates the present invention is enclosed by a molded, plastic bezel 2 on the front, a molded, plastic panel 3 on the back, a sheet metal cover 4 on the top with downwardly extending side flaps 4a, and a sheet metal cover on the bottom with upwardly extending side flaps 5a. A handle 6 is mounted on one side of the terminal 1 between the side flaps 4a and 5a for carrying the terminal 1 from place to place. The bezel 2 provides a large, rectangular, frontal opening 8 in which the screen 9a of a CRT display unit 9 is disposed for viewing. Below the CRT display unit 9 is a horizontally extending cavity 10 in which a controller circuit board 11 is disposed. On the front edge of the circuit board 11 are two D-shell connectors 12 and on opposite sides of the circuit board 11 are a pair of cylindrical guideways 13 (only one being seen in FIG. 1) formed in the bezel 2. An application module 14 includes a keyboard 16 that is connected to a circuit board 17 (in phantom) disposed within the module 14. The application module 14 is attachable to the controller module 1a, having laterally extending guideposts 15 that are received in the guideways 13 to align electrical connectors (not shown) on the circuit board 17 that mate with the D-shell connectors 12 on the main body of the terminal 1.

The keyboard 16 is a matrix with seventy touch pad keys 18 arranged in five rows and fourteen columns. The faces of the keys 18 are blank, the symbols 21 for the keys being arranged on a Mylar overlay 19 which can be inserted and removed from the application module 14. The overlay 19 has apertures 19d and 19e along opposite edges that receive two guide pins 14a and 14b formed on the top surface of the application module 14 when the overlay 19 is placed over the keyboard 16. A window-frame cover 20, which is hinged along the top edge of the module 14 abutting the main body of the terminal 1, is folded over the overlay 19. The keys 18 are operated with finger touches on the Mylar overlay 19 at the respective key locations.

Figure 11:
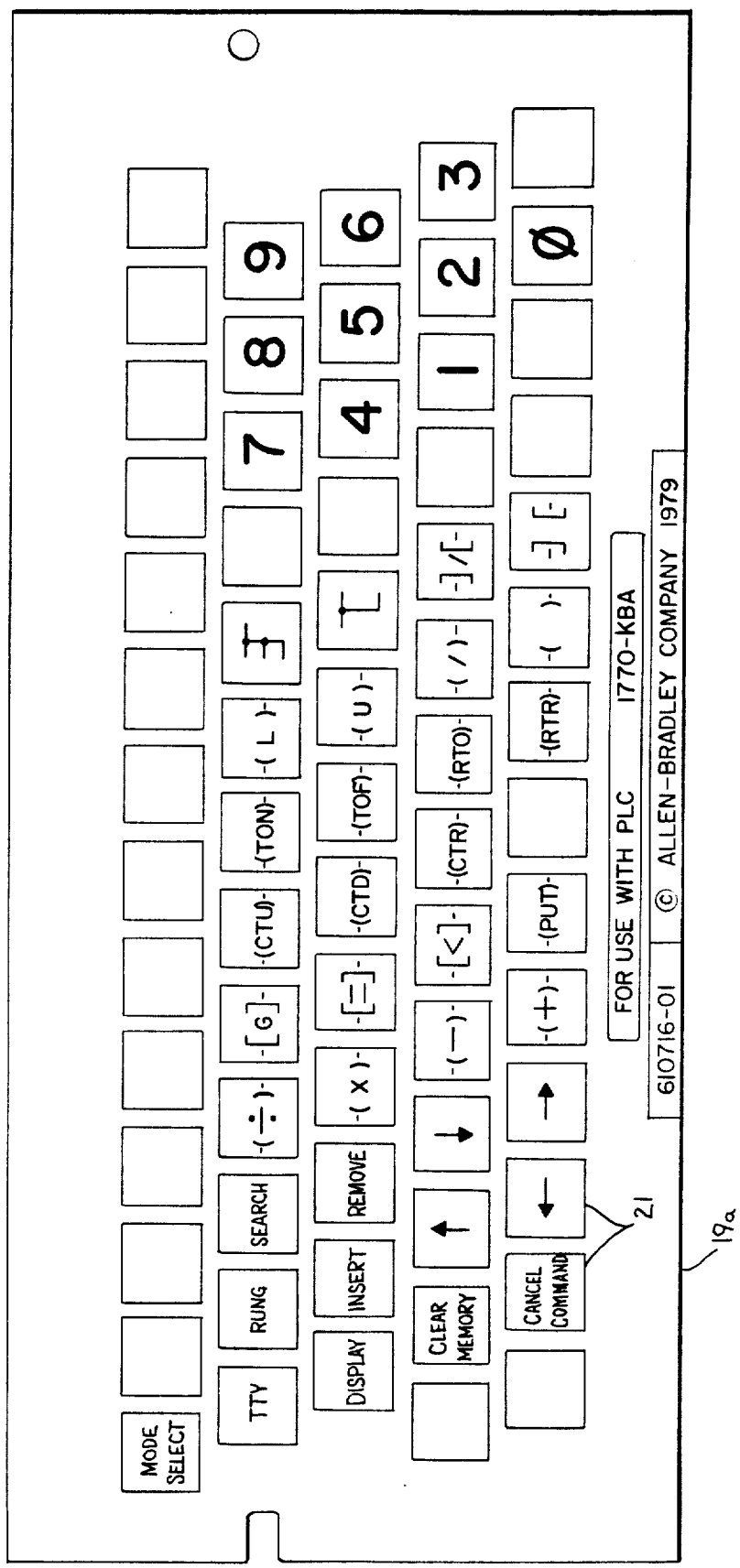
FIG. 11 is a plan view of a first keyboard overlay for use as seen in FIG. 1.
Figure 12:
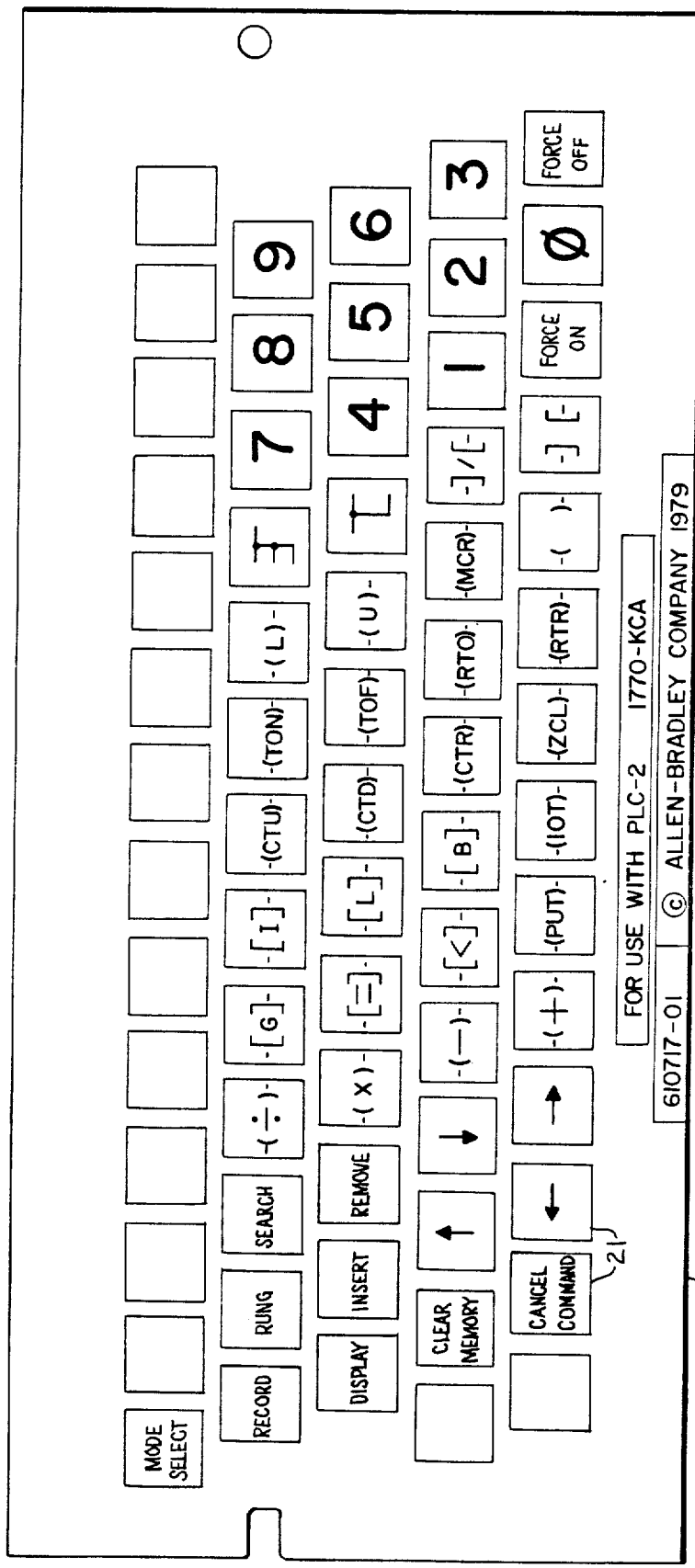
FIG. 12 is a plan view of a second keyboard overlay for use as seen in FIG. 1.
Figure 13:
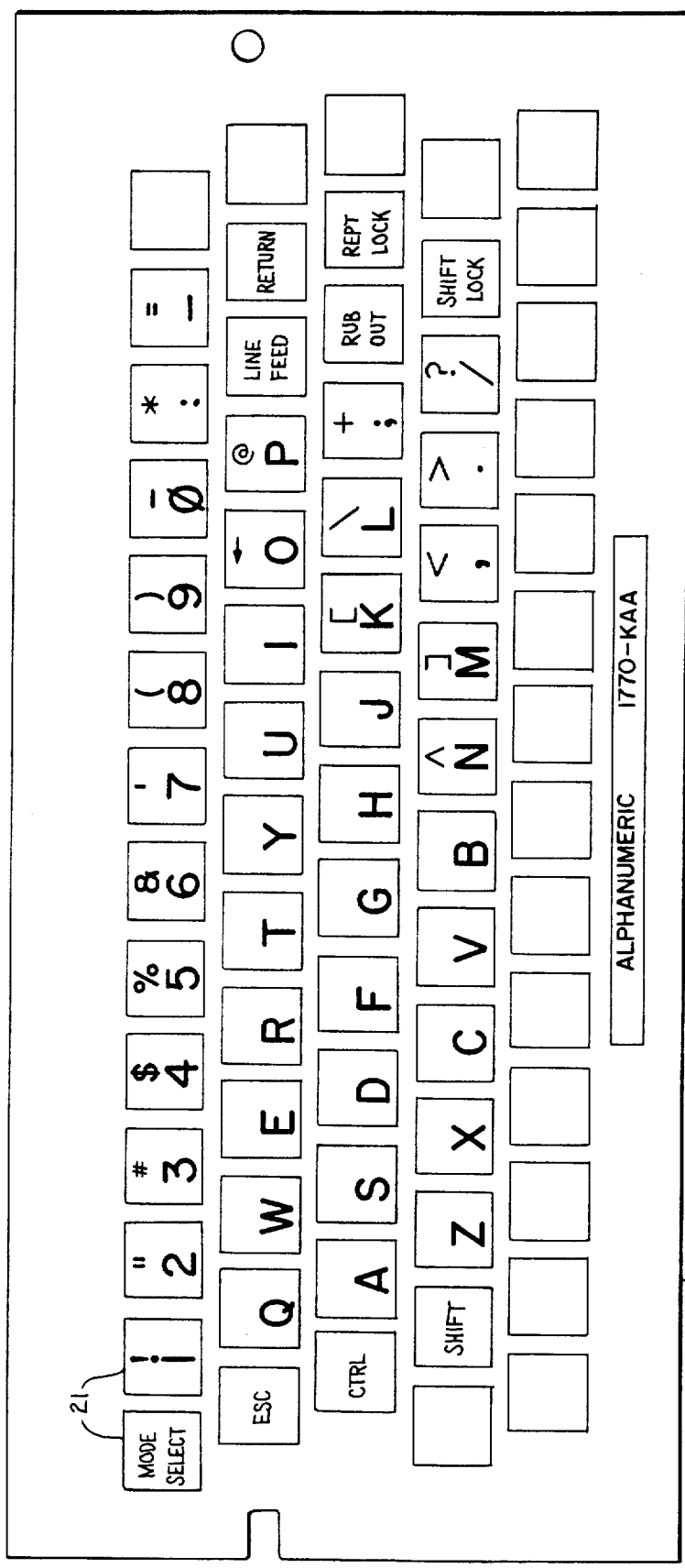
FIG. 13 is a plan view of a third keyboard overlay for use as seen in FIG. 1.

The interchangeable Mylar overlay 19 is one of several different overlays 19a-19c seen in FIGS. 11-13 which can be used with a single application module 14, and several different application modules 14 can also be provided, each having an overlay with a distinctive set of character representations for the keys 18 for a particular application. For example, the personality of the detachable module 14 and the overlay 19a of FIG. 11 provide the industrial terminal 1 with the capability of emulating a program panel for a programmable controller of the type disclosed in Dummermuth et al. U.S. Pat. No. 3,942,158, issued Mar. 2, 1976. By substituting the overlay 19b of FIG. 12, the terminal 1 can emulate a program panel for a programmable controller of the type disclosed in Dummermuth et al. U.S. Pat. No. 4,165,534, issued Aug. 21, 1979. With the overlay 19c of FIG. 13, the terminal 1 can be used for report generation or message entry with communications via an RS-232-C standard serial channel. By substituting an entirely new application module 14 with one or more of its own application overlays 19, the industrial terminal 1 can be used in a wide variety of other applications. Without an application module 14, the terminal 1 acts as a CRT monitor which can receive characters through an RS-232-C serial channel.

Further details of the mechanical structure of the terminal 1 are disclosed in U.S. Pat. No. 4,326,193, issued Apr. 20, 1982 entitled "Terminal with Interchangeable Application Module" and assigned to the assignee of the invention described herein. The remainder of this description is primarily directed to the electrical characteristics of the terminal 1.

Figure 2:
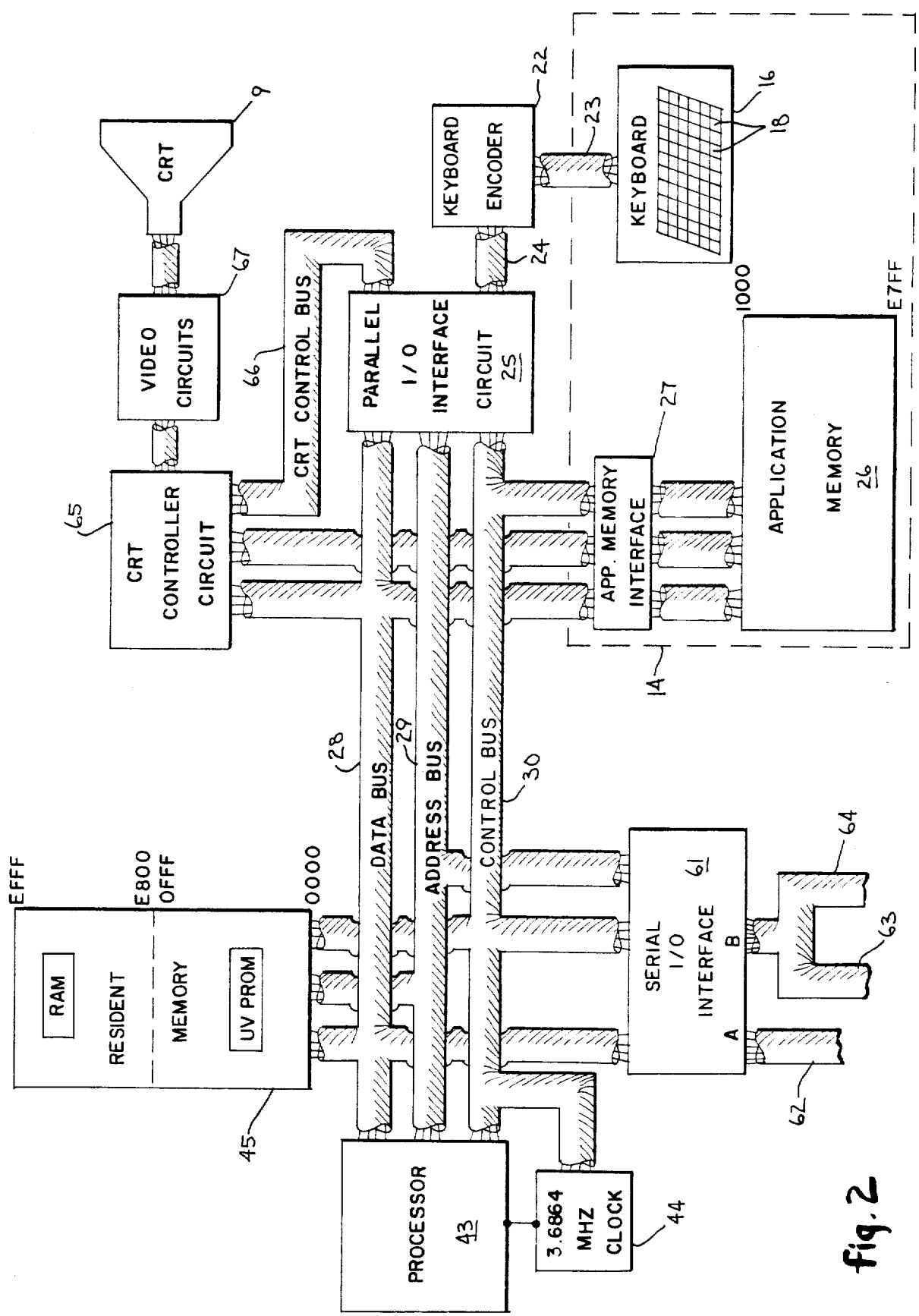
FIG. 2 is an electrical block diagram of the industrial terminal of FIG. 1.
Figure 7:
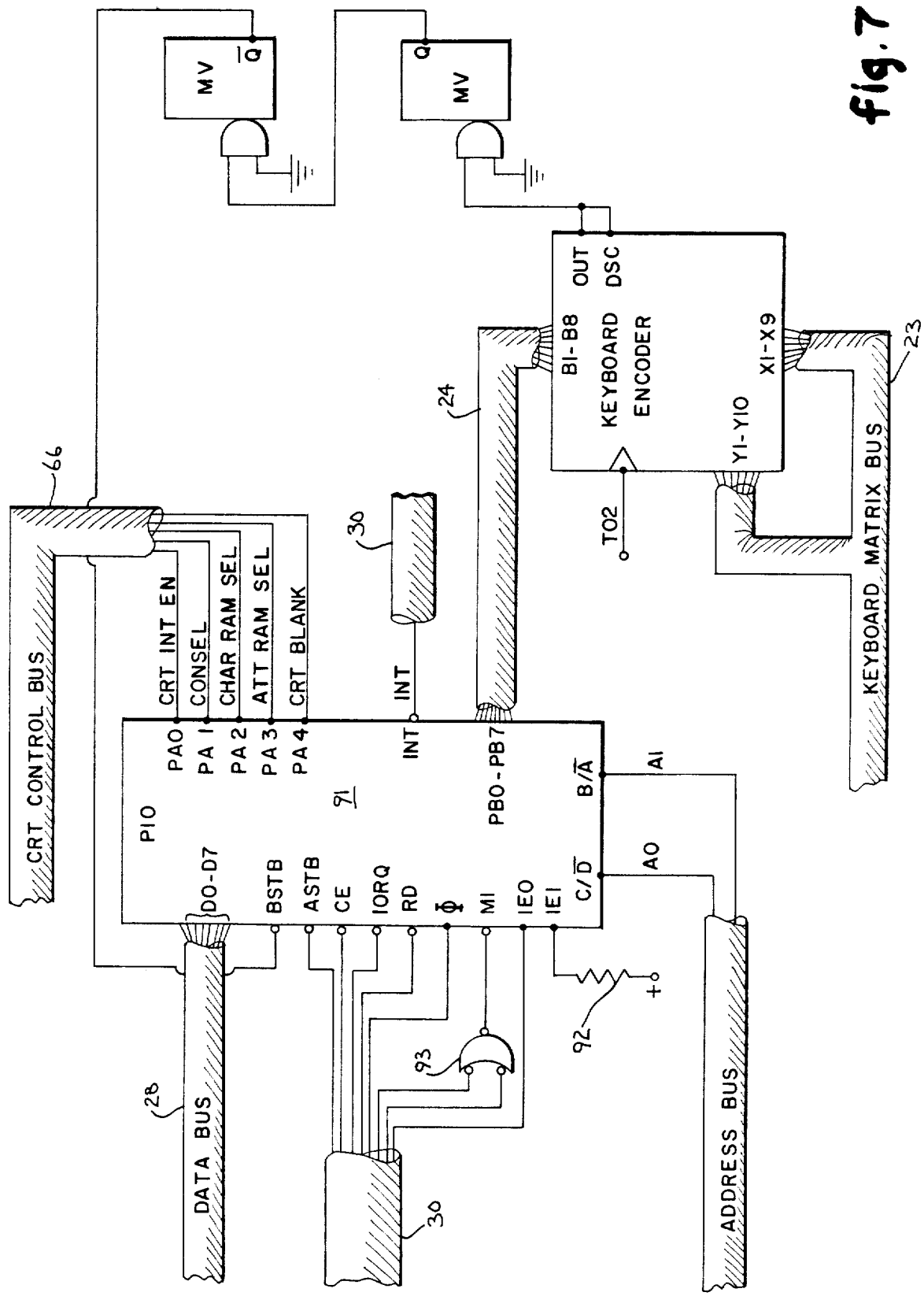
FIG. 7 is an electrical schematic diagram of the parallel I/O interface circuit which forms part of the terminal of FIG. 2.

Referring to FIG. 2, the application module 14 and the controller module 1a are seen in schematic form. The keyboard 16 is coupled to a keyboard encoder 22 through a keyboard matrix bus 23. As seen in FIG. 7, this keyboard matrix bus 23 has lines X1-X9 and Y1-Y10 connected to corresponding inputs on the keyboard encoder 22, which is an MM5740 available from National Semiconductor Corp. The key 18 in row one and column one of the keyboard matrix generates signals on lines X1 and Y1 when it is touched. The keys 18 are distinguished by assigning a unique X-Y line combination to each key 18. The keyboard encoder 22 generates a corresponding 8-bit code through outputs B1-B8 to corresponding lines of a key code bus 24. As seen in FIG. 2, the key code bus 24 is coupled to an I/O port on a parallel I/O interface circuit 25.

Figure 6:
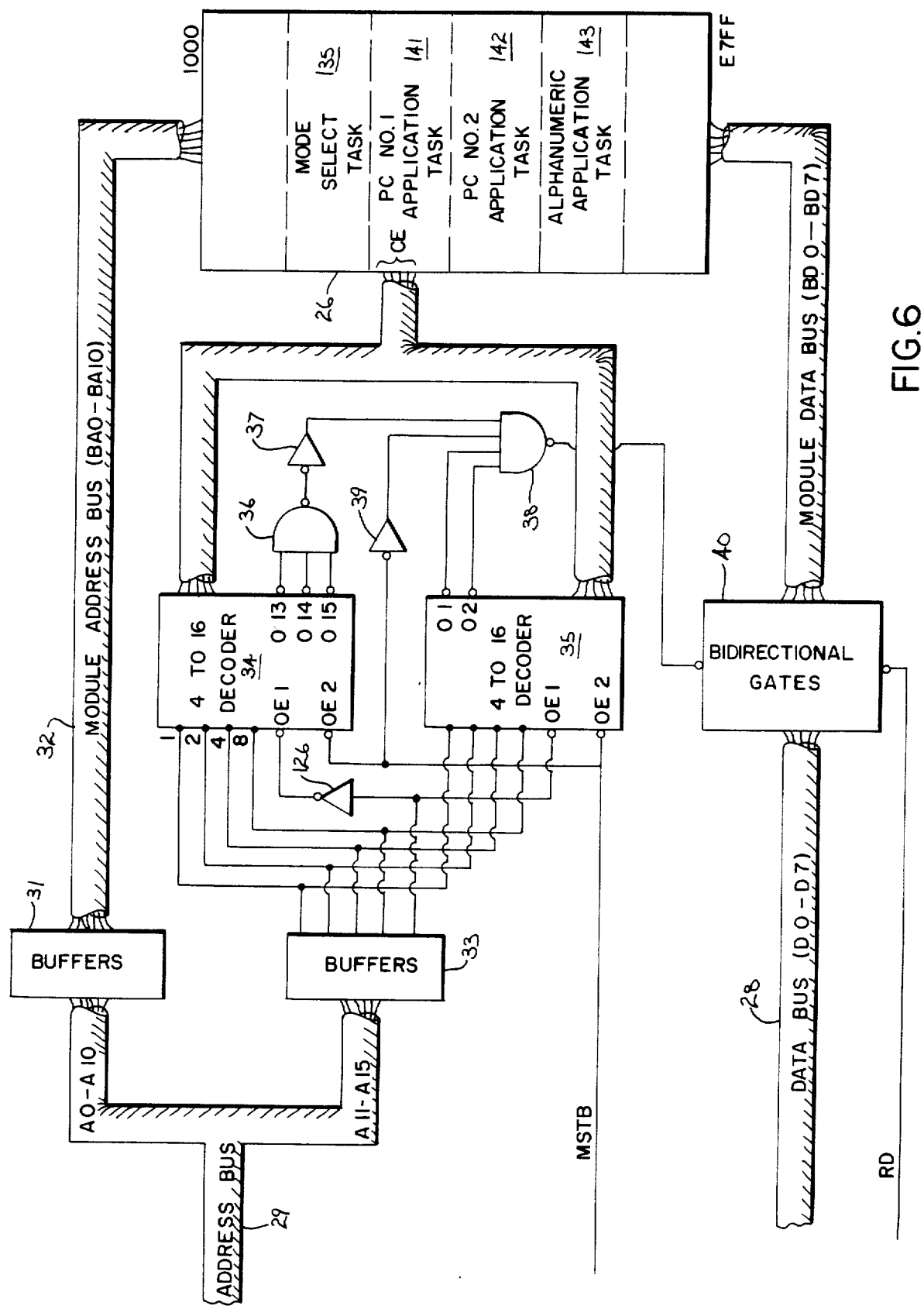
FIG. 6 is an electrical schematic diagram of the application module forms part of the terminal of FIG. 2.

The other element of module 14 besides the keyboard overlay 19 which characterizes its personality is an application memory 26. As seen in FIG. 6 the application memory 26 stores instructions organized in a MODE SELECT routine 135, a PC No. 1 application routine 141, a PC No. 2 application routine 142 and a ALPHANUMERIC application routine 143. In this embodiment, this memory includes up to 54 k × 8-bits of RAM and EPROM memory, however, the type of memory selected is optional. As seen in FIG. 2, the application memory 26 is coupled through an application memory interface 27 to a main data bus 28, a main address bus 29 and a main control bus 30 in the controller module 1a. The physical connections for both the application memory interface 27 and the keyboard matrix bus 23 are included in the connectors that mate as described above in connection with FIG. 1.

The details of the application memory 26 and its interface 27 are seen in FIG. 6, where lines A0-A10 of the main address bus 29 are coupled through a set of buffers 31 and lines BA0-BA10 of a module address bus 32 to the application memory 26. Lines A11-A14 of the main address bus 29 are coupled through a second set of buffers 33 to the "1," "2," "4," and "8" inputs on two 4-line-to-16-line decoders 34 and 35. The A15 address line is coupled through the buffers 33 and an inverter 126 to the OE1 (first output enable) input on the first decoder 34. Line A15 is also coupled through the buffers 33 to the OE1 input on the second decoder 35. An MSTB (memory strobe) line is connected to the OE2 (second output enable) input on the two decoders 34 and 35. Outputs 013-015 on the first decoder 34 are coupled through a three-input NAND gate 36 and an inverter 37 to one input on a four-input NAND gate 38. The MSTB line is coupled through an inverter 39 to another input on this NAND gate 38, as are outputs 01 and 02 on the second decoder 35. The output of the NAND gate 38 is connected to a set of bi-directional gates 40 that couple the main data bus 28 to an application module data bus 41, these gates 40 being enabled in one direction by a low signal from the output of the NAND gate 38, and being enabled in the other direction by a logic low signal on an RD (read) line connected to the gates 40. Signals on lines A11-A15 of the main address bus 29 are therefore decoded to enable individual chips in the application memory 26 as well as to enable the data bus gates 40 when data is to be written to the application memory 26. Lines A0-A10 of the address bus 29 carry signals for addressing a line within the selected chip. The 54 k lines of the application memory 26 reside between addresses 1000 (hexadecimal) and E7FF (hexadecimal).

Referring again to FIG. 2, the controller module 1a is directed by a main processor 43 that is coupled to the main buses 28-30. A 3.6864 megahertz clock circuit 44 is connected to a clock terminal on the processor 43 to provide timing signals for the processor 43, and the clock circuit 44 is also connected through the control bus 30 to provide timing signals to other circuits in the terminal 1.

Figure 4:
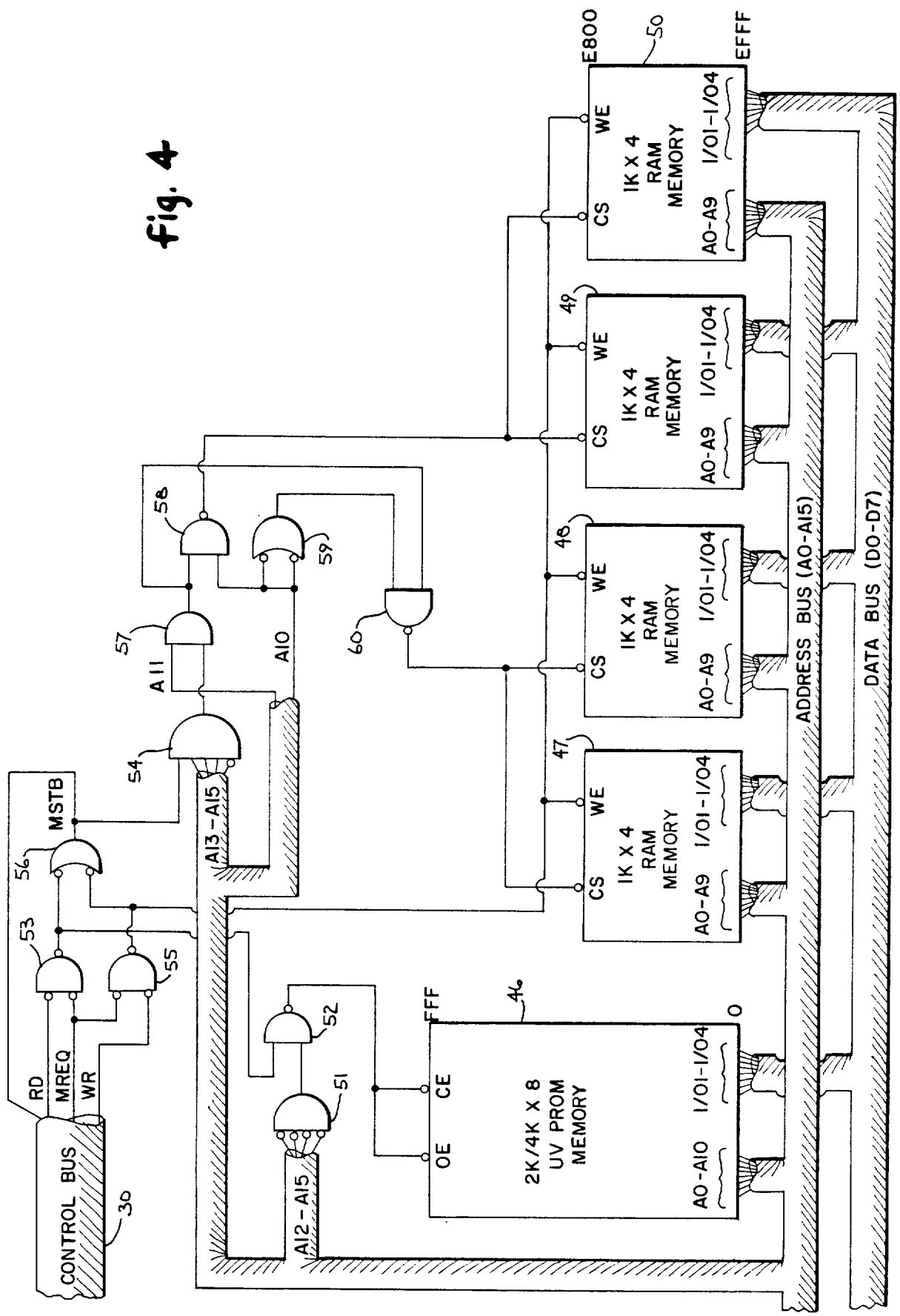
FIG. 4 is an electrical schematic diagram of the resident memory circuit which forms part of the terminal of FIG. 2.

The main processor 43 fetches and executes instructions from a resident memory 45, which is also connected to the main buses 28-30. As seen in FIG. 4, the resident memory 45 includes from 2 k to 4 k × 8-bits of UV PROM memory 46 and four 1 k × 4-bit RAM memory chips 47-50. The UV PROM has address inputs connected to lines A0-A10 of the main address bus 29, while the RAM memory chips 47-50 have inputs connected to lines A0-A9 of the address bus 29. The UV PROM memory 46 has eight data terminals connected to lines D0-D7 of the main data bus 28. The RAM memory chips 47 and 48 have data terminals I/0 1-I/0 4 connected to lines D0-D3 of the data bus 28 and RAM memory chips 49 and 50 have data terminals I/0 1-I/0 4 connected to lines D4-D7 of the data bus 28. Lines A12-A15 of the address bus 29 are coupled through a low true OR gate 51 to one input of a NAND gate 52.

A number of address and control lines are coupled through decoding circuitry to enable various portions of the resident memory 45. An RD (read) line and an MREQ (memory request) line in the control bus 30 are coupled through a low true NAND gate 53 to second input on the NAND gate 52. The output of the NAND gate 52 is connected to both the CE (chip enable) and the OE (output enable) inputs on the UV PROM memory 46 to enable the memory 46 when the control signals are received through lines A12-A15 and the control bus 30. Lines A13-A15 are also connected to inputs on a low true OR gate 53 to generate control signals for enabling the RAM memory chips 47-50. The MREQ line and a WR (write) line in the control bus 30 are coupled through a low true AND gate 55 and a low true NAND gate 56 to another input on the low true OR gate 54. The output of the low true NAND gate 56 is connected to the MSTB line that also carries strobe signals to the application memory interface previously described in FIG. 6. The output of the low true NAND gate 55 is connected to WE (write enable) inputs on each of the RAM memory chips 47-50 and an enabling signal is generated to these inputs when data is written into the RAM portion of the resident memory 45. The output of the low true OR gate 54 and lines A10 and A11 of the address bus 29 are coupled through a series of gates 57-60 as seen in FIG. 4 with the output of NAND gates 58 and 60 being connected to the CS (chip select) inputs on respective pairs of RAM memory chips 47-48 and 49-50. Thus, signals on address lines A10, A11, A13-A15 and the MSTB line are decoded to enable selected RAM memory chips 47-50 in the resident memory 45. The main processor 43 addresses the UV PROM portion of the resident memory 45 at locations up to 2k or 4k depending upon the size selected by the user. The processor 43 addresses the RAM portion of the resident memory 45 at locations between approximately 58k-60k or E800 (hexadecimal) to EFFF (hexadecimal).

Referring again to FIG. 2 the main processor 43 can be connected to other computer devices outside the terminal 1 through a serial I/O interface 61 which connects the main buses 28-30 to serial I/O ports A and B and three serial I/O channels 62-64 connected to these ports. Serial I/O port "A" is connected to a standard RS-232-C serial channel 62, and is further adapted to be connected to an RS-449 serial channel if and when it becomes standard. The other serial I/0 port "B" is connected in parallel to two serial I/0 channels 63 and 64, the first channel 63 being that used with a programmable controller of the type in U.S. Pat. No. 3,942,158 (hereinafter PC No. 1), and the other channel 64 being of the type used with a programmable controller such as disclosed in U.S. Pat. No. 4,165,534 (hereinafter PC No. 2).

The main processor 43 of FIG. 2 is also connected through the address and data buses 28 and 29 to a CRT controller circuit 65. The parallel I/0 interface circuit 25 is also connected to the CRT controller circuit 65 through a CRT control bus 66. The CRT controller circuit 65 maintains an image of the characters to be displayed on the CRT 9, and directs the coupling of these characters through video circuits 67, which translate the data to the video information required by the CRT 9. The main processor 43 is periodically interrupted by the CRT controller circuit 65 during a vertical retrace on the CRT screen 9a to couple character data to the CRT 9 from the scratchpad RAM 42 in the resident memory 45.

Figure 3:
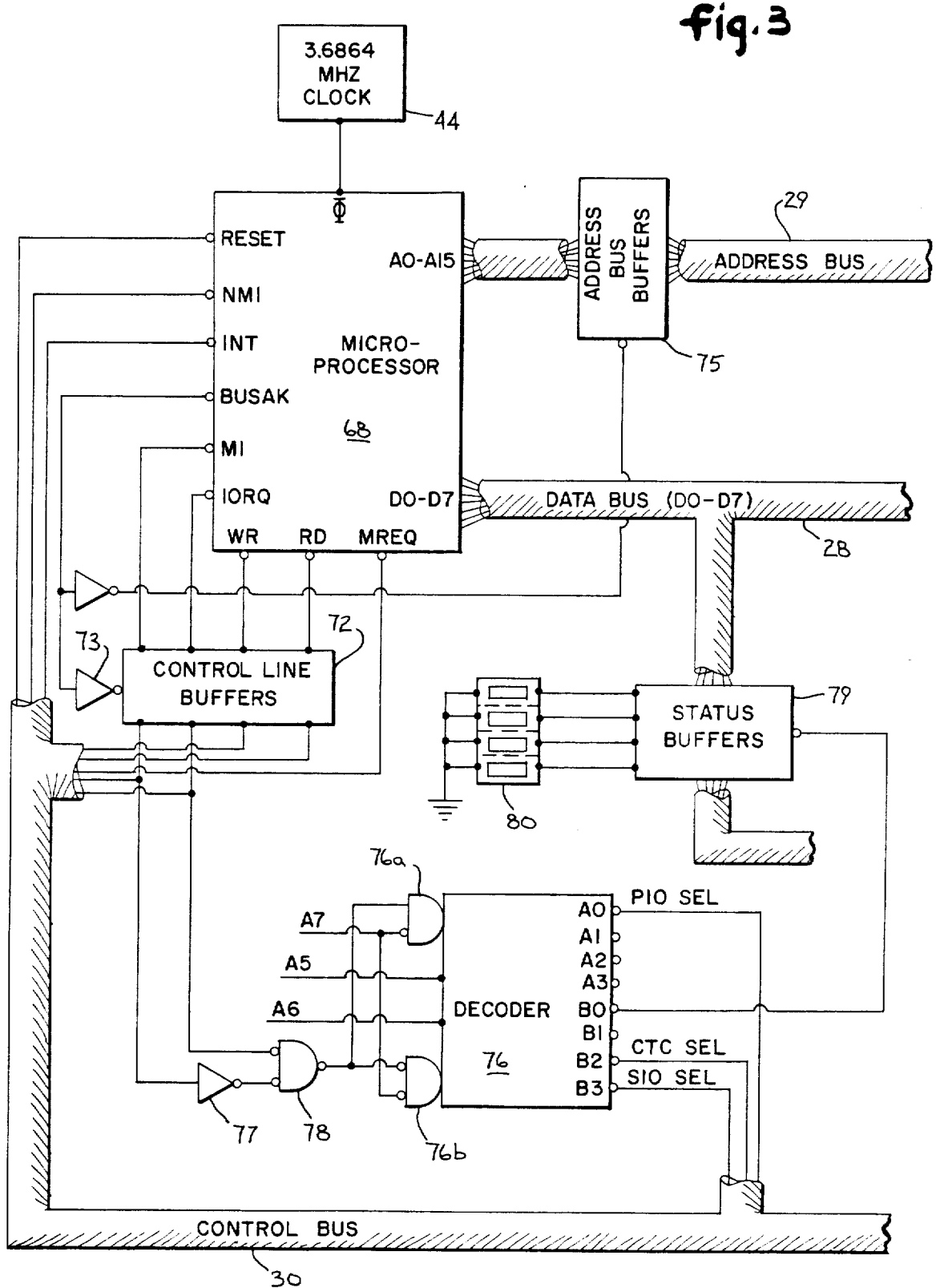
FIG. 3 is an electrical schematic diagram of the processor circuit which forms part of the terminal of FIG. 2.

As seen in FIG. 3, the main processor 43 includes a microprocessor 68, which in this embodiment is a Z80A-CPU manufactured by Zilog, Inc. This microprocessor 68 performs processing, control and arithmetic operations in response to the timing signals received from the clock circuit 44 at a clock phase (∅) input and in response to program instructions fetched from the resident memory 45 or the application memory 26. Besides address terminals A0–A15 and data terminals D0–D7 the microprocessor 68 has a number of control terminals. Briefly, these include a RESET terminal, an NMI (non-maskable interrupt) terminal, an INT (interrupt request) terminal, a BUSAK (bus acknowledge) terminal, an M1 (machine cycle 1) terminal, an IORQ (input/output request) terminal, a WR (write) terminal, an RD (read) terminal and an MREQ (memory request) terminal. These terminals are connected through corresponding lines in the control bus 30 to the parallel I/0 interface circuit 25 and the serial I/0 interface circuit 61.

The microprocessor 68 is interrupted when an active signal is received on the NMI line, and can also be interrupted when a signal is received through the INT line. Interrupts are acknowledged by generating signals through the M1 and IORQ lines. When an interrupt occurs, the microprocessor 68 will begin communicating with the interrupting device, provided that the device has generated the highest priority interrupt then pending. For ordinary memory addressing the microprocessor 68 generates signals on the MREQ line, and either the WR line or the RD line depending on whether a memory read or write operation is being executed. For more information on the Z80A-CPU microprocessor 68, such as its architecture, operation and instruction set, reference is made to a "Z80-CPU Technical Manual," copyright 1976 by Zilog, Inc.

The M1, IORQ, WR and RD lines in the control bus 30 are connected through a set of control line buffers 72, the BUSAK line being connected through an inverter 73 to an enable input on the buffers 72. The BUSAK line is also connected through another inverter 74 to an enable input on a set of address bus buffers 75. The M1 and IORQ lines are connected with the A5–A7 address lines to a dual gate input, 2-line-to-4-line decoder 76. This decoder 76 decodes signals on these particular control and address lines to enable one of four hardware circuits. The A5 and A6 address lines are connected to the "1" and "2" inputs on the decoder 76 while the A7 address line is connected to enable each of the gated inputs 76a and 76b. The M1 line is connected through an inverter 77 to one input on a low true AND gate 78 and the IORQ line is connected to the other output on this AND gate 78. The output of this AND gate is connected to each of the gated inputs 76a and 76b, selecting the first one 76a with a logic high signal, and selecting the second one 76b with a logic low signal. The A0, B2 and B3 outputs are connected to a PIO SEL (PIO select) line, a CTC SEL (CTC select) line, and an SIO SEL (SIO select) line in the control bus 30. The B0 output on the decoder 76 is connected to an enable input on a set of status buffers 79. The status buffers 79 couple a set of DIP switches 80 to the data bus 28, these switches 80 allowing the user to select certain options through hardware rather than program instructions. These switches 80 determine 50 or 60 hertz operation, default mode, baud rate, and the type of parity selected.

Figure 5:
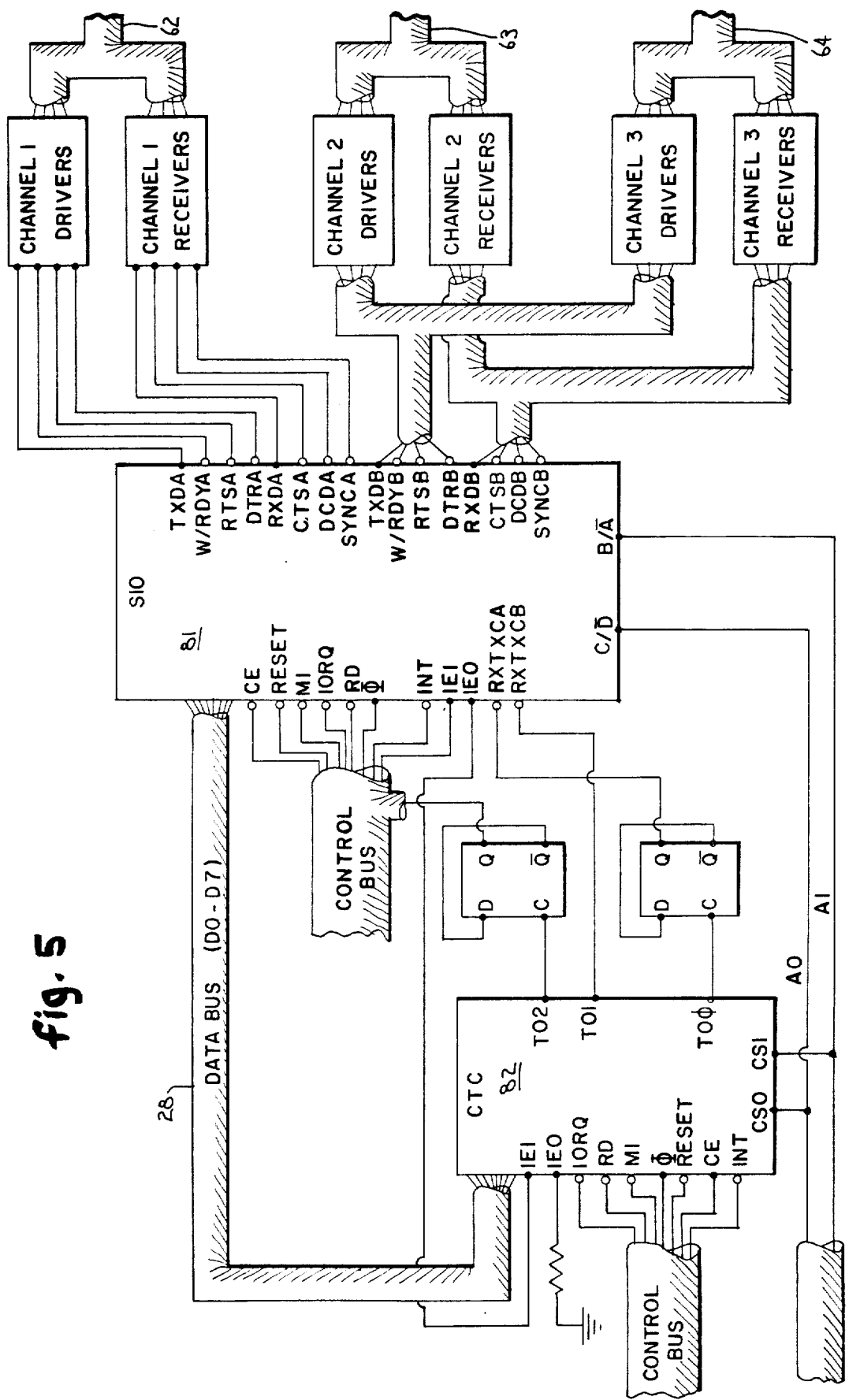
FIG. 5 is an electrical schematic diagram of the serial I/O interface circuit which forms part of the terminal of FIG. 2.

Referring to FIG. 5, the SIO SEL line in the control bus 30 is connected to a CE (chip enable) input on an SIO (serial I/0) chip 81, and the CTC SEL line is connected to a CE input on a CTC (counter-timer circuit) chip 82. The SIO chip 81 is a dual channel peripheral component for operating in different serial communication modes in micro-electronic systems. It basically functions as a serial-to-parallel, parallel-to-serial converter/controller. The serial communication mode for the SIO 81 is controlled by program instructions, to allow the selection of different modes of operation and options within these modes. The CTC chip 82 provides timing signals through outputs T00–T02, the clock rates of these timing signals being selected by programmed information loaded into several control registers. The information for the CTC registers is obtained from the microprocessor 68, placing the CTC under program control.

After the SIO and CTC 81 and 82 are turned on, interrupt signals are generated at their INT outputs through the control bus 30 to the microprocessor 68. When ready to acknowledge these interrupt signals, the microprocessor 68 will signal the SIO 81 and the CTC 82 through the M1 and IORQ inputs on the two chips. The SIO 81 and the CTC 82 are connected in an interrupt priority daisy chain through an IEI (interrupt enable input) terminal and an IEO (interrupt enable output) terminal on each chip. The IEO terminal on the CTC chip 82 is connected through a pull-down resistor 83 to a circuit ground indicating that this chip has the lowest priority in the interrupt daisy chain. The IEI terminal on the SIO 81 is connected to a line in the control bus 30 and the IEO terminal on the SIO 81 is connected to the IEI terminal on the CTC chip 82. The IEI input on the CTC is active only when a logic high signal is present, so that when a logic low signal is generated from the IEO output on the SIO 81 the CTC 82 will be prevented from generating an interrupt signal.

After the microprocessor 68 acknowledges an interrupt from the CTC chip 82, it couples data through the main data bus 28 to data inputs on the CTC chip 82, and more particularly to one of four specific registers. These registers are selected by signals on the A1 and A0 address lines which connect to CS0 (chip select 0) and CS1 (chip select 1) inputs on the CTC chip 82.

After an interrupt from the S10 chip 81 is acknowledged, data is coupled to it through the main data bus 28. The SIO chip 81 is initialized by sending commands over the data bus 28, some of the commands being followed by data to be loaded into write registers WR0–WR7 to set the parameters of operation for the SIO chip 81. The SIO chip 81 also has three read registers, RR0–RR2. The nature of the data and the channel of the SIO 81 to which it pertains is determined by signals on the A1 and A0 address lines. The A1 address line is connected to a B/$\overline{\text{A}}$ (channel select) input on the SIO 81, and the A0 address line is connected to a C/$\overline{\text{D}}$ (control data select) input on the SIO 81.

If the SIO chip 81 or the CTC chip 82 is to be reprogrammed, the write registers and control registers are cleared through a signal received on a control bus line connected to RESET inputs on the two chips 81 and 82. Data can also be read from selected registers in the SIO and CTC chips 81 and 82 with control of the read/write cycle being accomplished through a line connected to the RD (read) inputs on the two chips 81 and 82. Timing signals for the two chips are provided by the main clock circuit 44 in FIG. 2 and received at the ∅ inputs of the chips 81 and 82.

The CTC chip 82 generates various output timing signals, including a one kilohertz signal coupled through terminal T02 and through the control bus 30 to the keyboard encoder 22 in FIGS. 2 and 7. As seen in FIG. 6, the clock signal from the T02 output on the CTC is cycled through a D-type flip-flop 83 to provide a symmetrical wave with a logic high portion of the same duration as the logic low portion of the pulse. Timing signals for channel A of the SIO chip 81 are coupled through a line connecting the T00 output on the CTC chip 82 and the RxTxCA (channel A clock input) on the SIO chip 81, this line being connected through another D-type flip-flop 84 to give the timing pulses a 50% duty cycle (symmetrical waveform). Timing signals for channel B of the SIO chip 81 are coupled through a line connecting the T01 output on the CTC chip 82 and the RxTxCB (channel B clock input) on the SIO chip 81.

After the SIO chip 81 has been programmed under the direction of the microprocessor 68, communication can be conducted through its serial I/0 ports A and B with other peripheral devices. The serial data outputs are designated TxDA and TxDB for channels A and B, respectively, while the serial data inputs are designated RxDA and RxDB, for channels A and B, respectively. A number of other terminals, including RTSA, DTRA, CTSA, DCDA, RTSB, DTRB, CTSB and DCDB are also included in serial I/0 ports A and B so that hand shaking signals can be coupled between the SIO chip 81 and the peripheral devices at the other end of the serial channels 62–64. The SYNC A and SYNC B terminals couple signals for synchronizing data input and output through the serial channels 62–64. The W/RDYA and W/RDYB terminals in the serial I/0 ports provide ready and wait signals to synchronize the microprocessor 68 and the SIO chip 81, when the two devices are communicating at different data rates.

The TxDA, W/RDYA, RTSA and DTRA terminals are connected through a set of channel 1 drivers to the first serial channel 62. The RxDA, CTSA, DCDA and SYNC A terminals are connected through the "channel 1" receivers 86 to the first serial channel 62. Because the other serial channels 63 and 64 are connected in parallel to serial I/0 port B, the TxDB, W/RDYB, RTSB and DTRB terminals are connected through a set of "channel 2" drivers 87 to the second serial channel 63 and through a set of "channel 3" drivers 89 to the third serial channel 64. Similarly, the RxDB, CTSB, DCDB and SYNC B terminals are connected to two sets of channel receivers 88 and 90 for the second and third serial channels 63 and 64.

In this embodiment, the SIO chip 81 is a Z80-SIO manufactured by Zilog, Inc. and reference is made to a "Z80-SIO Technical Manual," copyright 1977 by Zilog, Inc. for further information concerning the architecture and operation of this chip 81. The CTC chip 82 is a Z80-CTC and reference is made to a "Z80-CTC Technical Manual," copyright 1977 by Zilog, Inc., for further information on the architecture and operation of this chip.

Referring to FIG. 7, the parallel I/0 interface circuit 25 more particularly includes a PIO (parallel I/0) circuit chip 91 with ports A and B connected to two channels that couple parallel data. The PIO chip 91 has a CE (chip enable) input connected to the PIO SEL line in the control bus 30 to receive enabling signals thereon. The PIO chip 91 has an INT output coupled to the INT input on the microprocessor 68, similar to the SIO and CTC chips 81 and 82. The PIO chip 91 is assigned the highest priority in the interrupt daisy chain, and therefore, has its IEI input connected to a positive voltage source through a pull-up resister 92, and further has its IEO output connected through the control bus 30 to the IEI input on the SIO chip 81. The PIO chip 91 receives timing signals at a ∅ input, read/write signals at an RD input, and interrupt acknowledge signals at M1 and IORQ inputs, similar to the SIO chip 81. The RESET line in the control bus 30 is coupled through a low true OR gate 93 to the M1 input, so that when an M1 active signal is received without an active RD or IORQ signal the PIO internal registers enter a reset state. Also like the SIO chip 81, lines A0 and A1 of the address bus 29 are connected to C/$\overline{\text{D}}$ (control/ data select) and B/$\overline{\text{A}}$ (port select) inputs on the PIO chip 91.

As mentioned previously regarding FIG. 2, the PIO chip 91 is connected to the CRT control bus 66, and as seen in FIG. 7, outputs PAO–PA4 on the PIO chip 91 are more particularly connected as follows. The PIO output is connected to a CRT INT EN (CRT interrupt enable) line; the PA1 output is connected to a CONSEL (controller select) line; the PA2 output is connected to a CHAR RAM SEL (character RAM select) line; the PA3 output is connected to an ATT RAM SEL (attribute RAM select) line; and the PA4 output is connected to a CRT BLANK (CRT blanking) line. The CRT INT EN line is normally enabled, while the other lines are enabled when data appears in the data bus 28 at the same time a stroke signal is received at an ASTB (port A strobe) input. An active signal at either the ASTB or BSTB (port B strobe) inputs generates an interrupt signal to the microprocessor 68 on the INT line. When data is received on the keyboard encoder bus 24 at inputs PBO–PB7, the data appears on the bus 24 at the same time a signal is received at a BSTB (port B strobe) input on the PIO chip 91. An OUT (out data strobe) output and a DSC (data strobe control) output on encoder 22 are coupled through a pair of multi-vibrators 94 and 95 to the BSTB input on the PIO chip 91. When data is sent to the PIO chip 91 on the key code bus 24, a strobe signal is generated from the OUT and DSC outputs and the multi-vibrators 94 and 95 to provide a strobe signal at the BSTB input. This generates the signal to the microprocessor 68 to service a keyboard interrupt.

The PIO chip 91 in this embodiment is a Z80-PIO circuit available from Zilog, Inc. and reference is made to a "Z80-PIO Technical Manual," copyright 1977 by Zilog, Inc., for further information concerning the architecture and operation of the PIO chip 91.

Figure 8A:
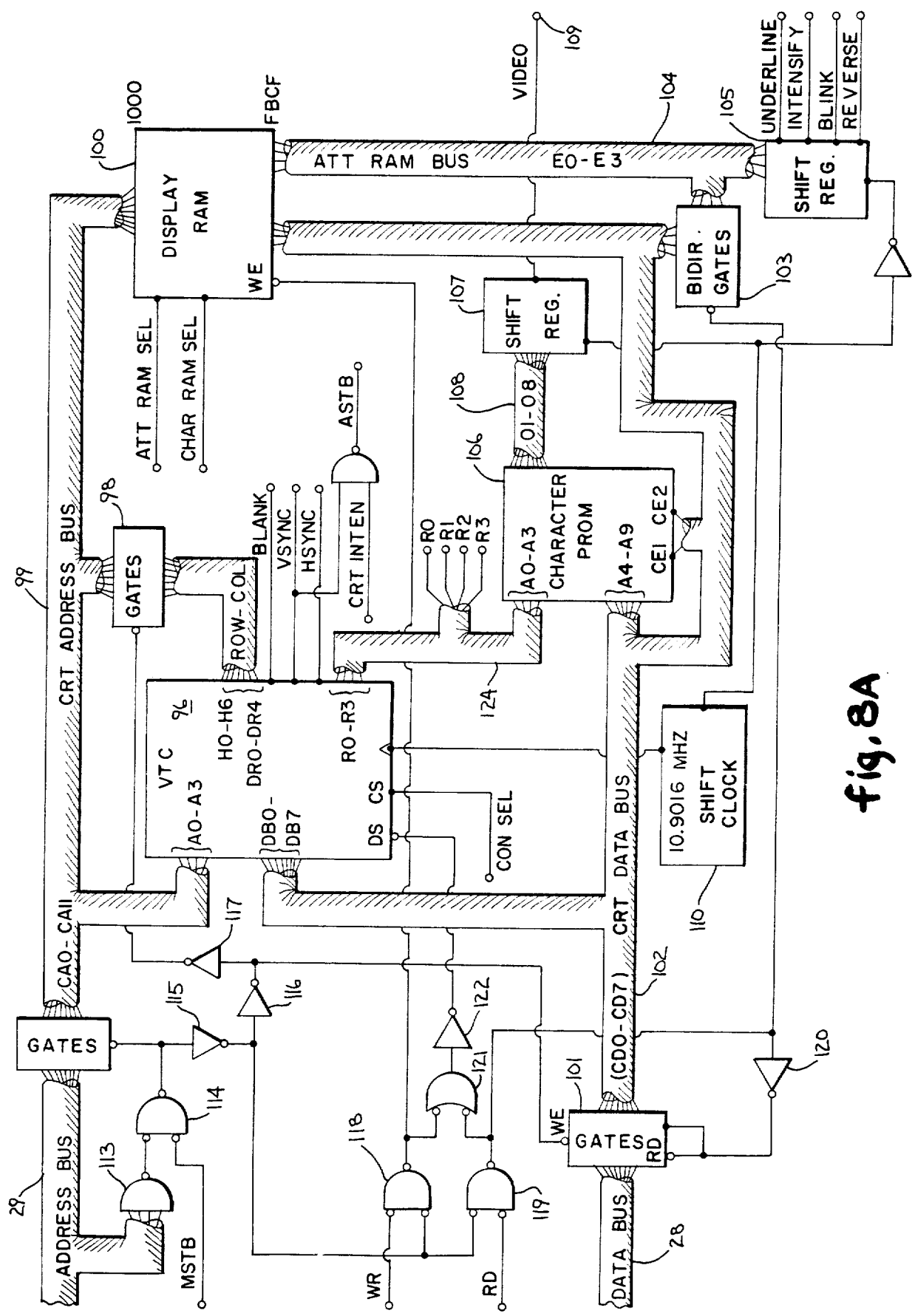
FIGS. 8a and 8b are electrical schematic diagrams of the CRT controller and video circuits which form part of the terminal of FIG. 2.

Referring to FIGS. 7 and 8a, the CONSEL line and the CRT BLANK line connect to a VTC (video timer-controller) chip 96 in FIG. 8a. This chip 96 contains the logic functions required to generate the timing signals for the presentation and formatting of non-interlaced video data on the CRT 9. Like the SIO chip 81 and the PIO chip 91, this chip is also programmable through seven 8-bit internal registers. In addition, two registers are provided to store a cursor character and row addresses for generation of the cursor video signal. The VTC chip 96 outputs data for a display matrix through column outputs HO–H6 and row outputs DRO–DR4. These outputs are coupled through a row and column bus 97 and a set of buffer gates 98 to a CRT address bus 99. Lines CAO–CA11 of the CRT address bus 99 are coupled to lines AO–A11 in the main address bus 29 through a set of bidirectional buffers 112 and are also coupled to address terminals on a display RAM 100. The display RAM 100 stores data at addresses from F000 (hexadecimal) to FBCF (hexadecimal), a twelve-bit line of memory being located at each address. The first eight bits of each line store character data, while the last four bits store flag data designating attributes of the character data. Thus an eight-bit wide portion of the display RAM 100 constitutes a CHARACTER RAM, while another four bit wide portion constitutes an ATTRIBUTE RAM. The main data bus 28 is connected to the CHARACTER RAM through a set of bidirectional buffer gates 101 and lines CD0–CD7 of a CRT data bus 102. Lines CD0–CD3 of the CRT data bus 102 are also coupled through another set of bidirectional gates 103 to an ATTRIBUTE RAM bus 104 with lines E0–E3. This bus 104 couples the ATTRIBUTE RAM to the CRT bus 102 and to a shift register 105.

The display RAM 100 is initially loaded through the main data and address buses 28 and 29 under the direction of the microprocessor 68. When a complete page of data is loaded, control is switched to the VTC circuit 96, which then operates independently of the microprocessor 68 in reading data from the display RAM 100 and coupling it to the CRT screen 9a. Characters from the display RAM 100 are coupled to address inputs A4–A9 on the character PROM 106 and to two chip enable inputs, CE1 and CE2. Lines CD6 and CD7 couple signals to the chip enable inputs to enable one of two 1 k × 8-bit PROM chips that constitute the character PROM 106. Signals on lines CD0–CD5 address a line within one of these chips. Each character is further subdivided according to the data in the lower four bits of each line in the character PROM 106. These bits are addressed through address inputs A0–A3 on the character PROM 106, which are driven by the VTC chip 96 through a raster scan bus 124 having lines R0–R3. Character data is coupled to a shift register 107 through lines 01–08 of a character PROM output bus 108. From the shift register 107 the character data is serially transmitted on a video line 109 at the video dot frequency to the video circuits 67 seen in FIG. 1.

At the same time character data is being transmitted on the video line 109, attribute data is coupled through the ATTRIBUTE RAM bus 104 to the shift register 105, where it is shifted through one of four outputs for the underline, intensify, blink and reverse functions that can be attributed to each character. The VTC chip 96 and the shift registers 105 and 107 for generating video and attribute data are all driven by a 10.9016 megahertz shift clock 110 that is connected to clock inputs on the VTC chip 96 and shift registers 105 and 107. The shift clock 110 is also connected through an inverter 111 to a clock input on the attribute data shift register 105.

As data is coupled to and from the display RAM 100 the gates 98, 101, 103 and 112 are enabled by signals coupled from the MSTB line, the WR line and the RD line through various logic gates. Lines A12–A15 of the address bus 29 are coupled through a NAND gate 113 to one input on a low true AND gate 114. The MSTB line is coupled to the other input of this AND gate 114 and the output of this AND gate 114 is connected to an enable input on the gates 112 coupling the main address bus 29 and the CRT address bus 99. The output of this AND gate 114 is also coupled through three inverters 115–117 to an enable input on the gates 98 coupling the row and column address bus to the CRT address bus 99. The output of the AND gate 114 is also coupled through the first two of these inverters 115 and 116 to a WE (write enable) input on the gates 101 coupling the data bus 28 and the CRT data bus 102. The output of the AND gate 114 is coupled through the first inverter to a pair of low true AND gates 118 and 119 having their other inputs connected to the WR line and the RD line respectively. The output of the gate 119 driven by the RD line is coupled through an inverter 120 to a RD (read enable) input on the gates 101 connecting the data buses 28 and 102. The output of the gate 118 driven by the WR line is connected to a WE (write enable) input on the display RAM 100 and, the outputs of both gates 118 and 119 are coupled through another low true AND gate 121 and an inverter 122 to a DS (data strobe) input on the VTC circuit 96. Thus it can be seen how data is coupled between buses 28, 29, 99 and 102 within the CRT controller circuit 65.

Once a page of data has been loaded into the display RAM 100, the VTC circuit 96 controls the coupling of this data to the CRT screen 9a. When the data in the display RAM 100 is to be updated or changed, the VTC circuit 96 generates a signal through the PIO chip 91 in FIG. 7, and specifically through the VSYNC (vertical synchronization) line which is NANDed with the CRT INT EN line through a NAND gate 123. The output of this NAND gate 123 is coupled through the ASTB line to the PIO chip 91 in FIG. 7 to allow the coupling of control signals to the VTC chip 96, or to portions of the display RAM 100, through the lines in the CRT control bus 66. The CONSEL line and the CRT BLANK line are directly connected to inputs on the VTC chip 96. The CHR RAM SEL line and the ATT RAM SEL line are connected to enable inputs in their respective portions of the display RAM 100.

By coupling the vertical SYNC signal to the microprocessor 68, the VTC chip 96 alerts the microprocessor 68 that a vertical retrace interval has begun where the screen trace moves from the bottom of the screen back to the top. During the vertical retrace the screen is blank for period of approximately 1.5 milliseconds, during which the PIO Chip 91 signals an interrupt to the main processor 68 and the display RAM 100 can be updated. The VTC chip 96 in this embodiment is a CRT 5027 video timer-controller circuit available from Standard Micro-Systems Corporation, and further information concerning this chip can be obtained from "Application Note 1-1," distributed by this manufacturer in 1979.

Figure 8B:
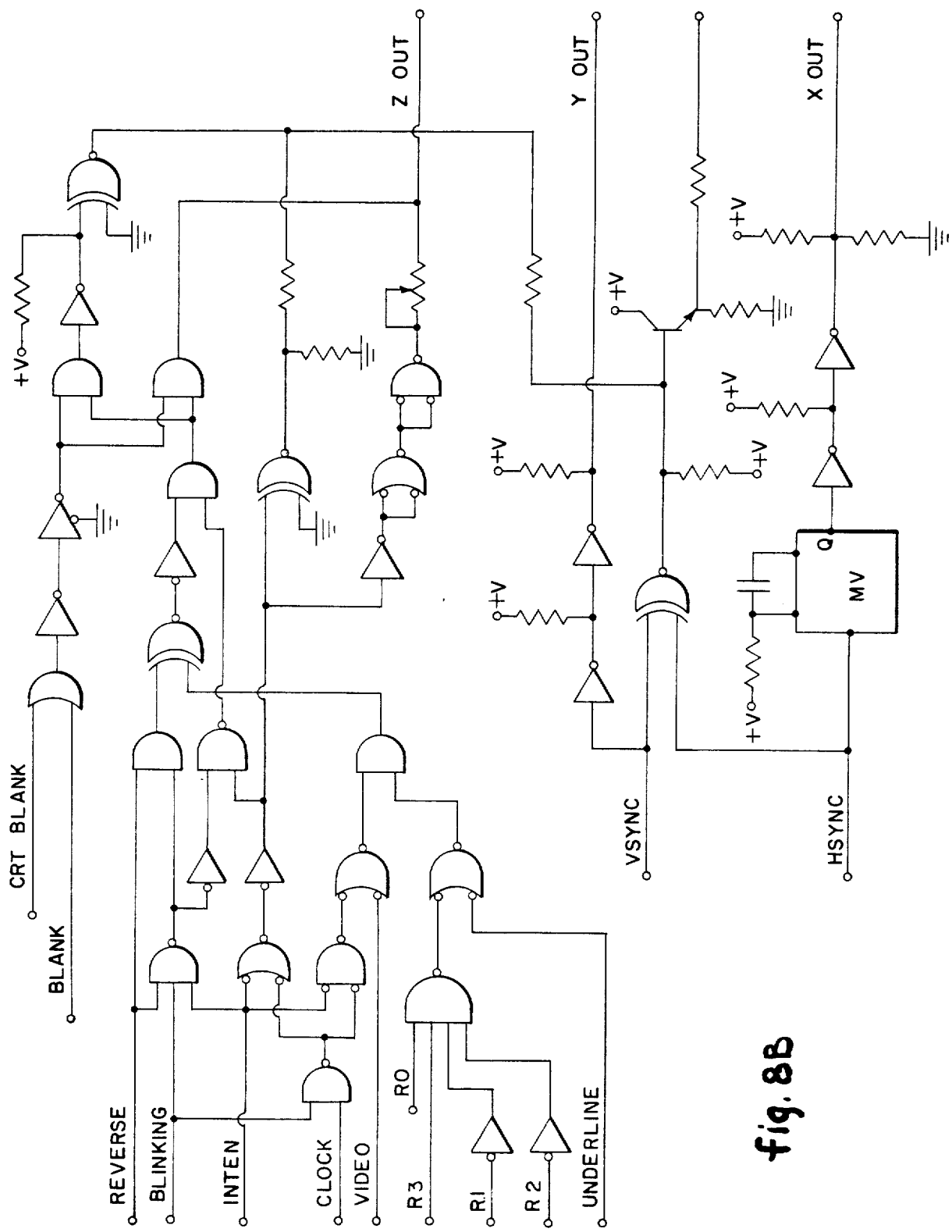

Referring to FIG. 8b, a set of input lines discussed in connection with FIG. 8a is coupled through logic circuitry to an X-OUT terminal, a Y-OUT terminal and a Z-OUT terminal. This logic circuitry converts the attribute signals, the video signal, the raster scan count signals, the vertical SYNC signal and the horizontal SYNC signal into a X (horizontal) component signal, a Y (vertical) component signal and a Z (video) component signal which are directly coupled to the CRT 9. The CRT 9 of FIG. 1 is preferably a TV-90 Data Display Monitor available from Ball Electronic Display Division, St. Paul, Min. The logic circuitry of the video circuit of FIG. 8b is designed for compliance with the specifications given in the service manual for the TV-50/90/ 120 Data Display Monitor, Specification No. 5-017-1035, Revision A, printed in Nov. 1977, by Ball Electronic Display Division, and EIA Standard RS-170. As these circuits are generally known in the art, and the gates in FIG. 8b are readily ascertainable, an enumeration of them is not deemed necessary for an understanding of the invention.

Figure 9:
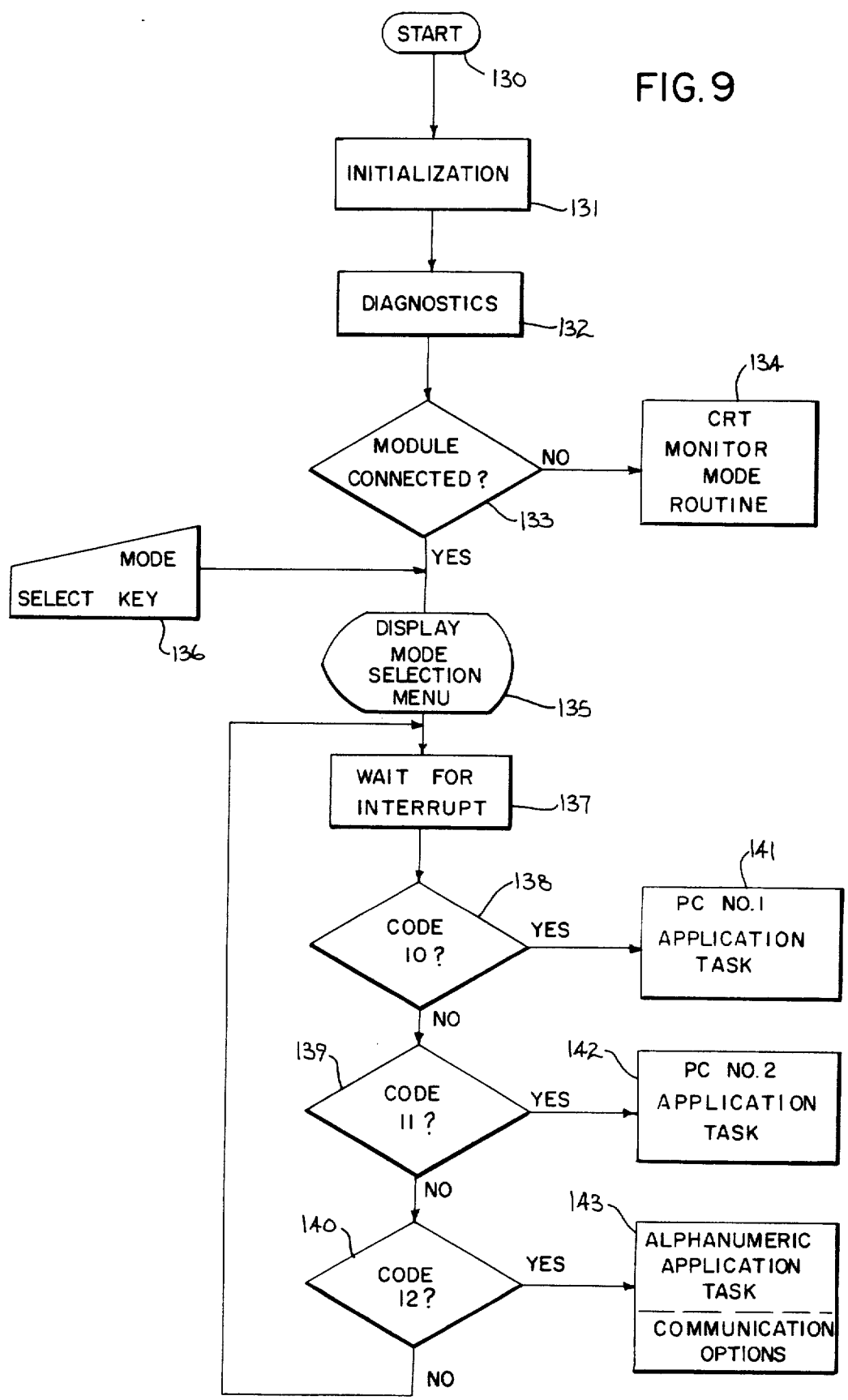
FIG. 9 is a flow chart of the general operation of the terminal of FIG. 2.

The microprocessor 68 of FIG. 3 (included within the processor 43 of FIG. 2) controls the operation of the hardware described above as directed by firmware instructions in the resident memory 45, and in the application memory 26 when an application module 14 is connected. When power is supplied to the terminal 1 to begin operation, the microprocessor 68 begins to read resident firmware instructions at addresses from 0000 to 0 FFF (hexadecimal) in the resident UV PROM memory 46 of FIGS. 2 and 4. The operation of the terminal 1 after that event is represented in FIG. 9, while the firmware operating system shown in FIG. 14 has been selected to accomplish the operation depicted in FIG. 9. This operating system has been developed around a real-time, multi-task executive program 150, which has been designed specifically for Mostek Z-80 and Intel 8080 microprocessors. It will be apparent to those skilled in the art from the description that follows that other microprocessors, and therefore other operating sytems, might be analogously employed to carry out the invention. The invention could also be carried out with less sophisticated firmware operating systems, however, the system described herein is considered to be the best mode for carrying out the invention.

Figure 14:
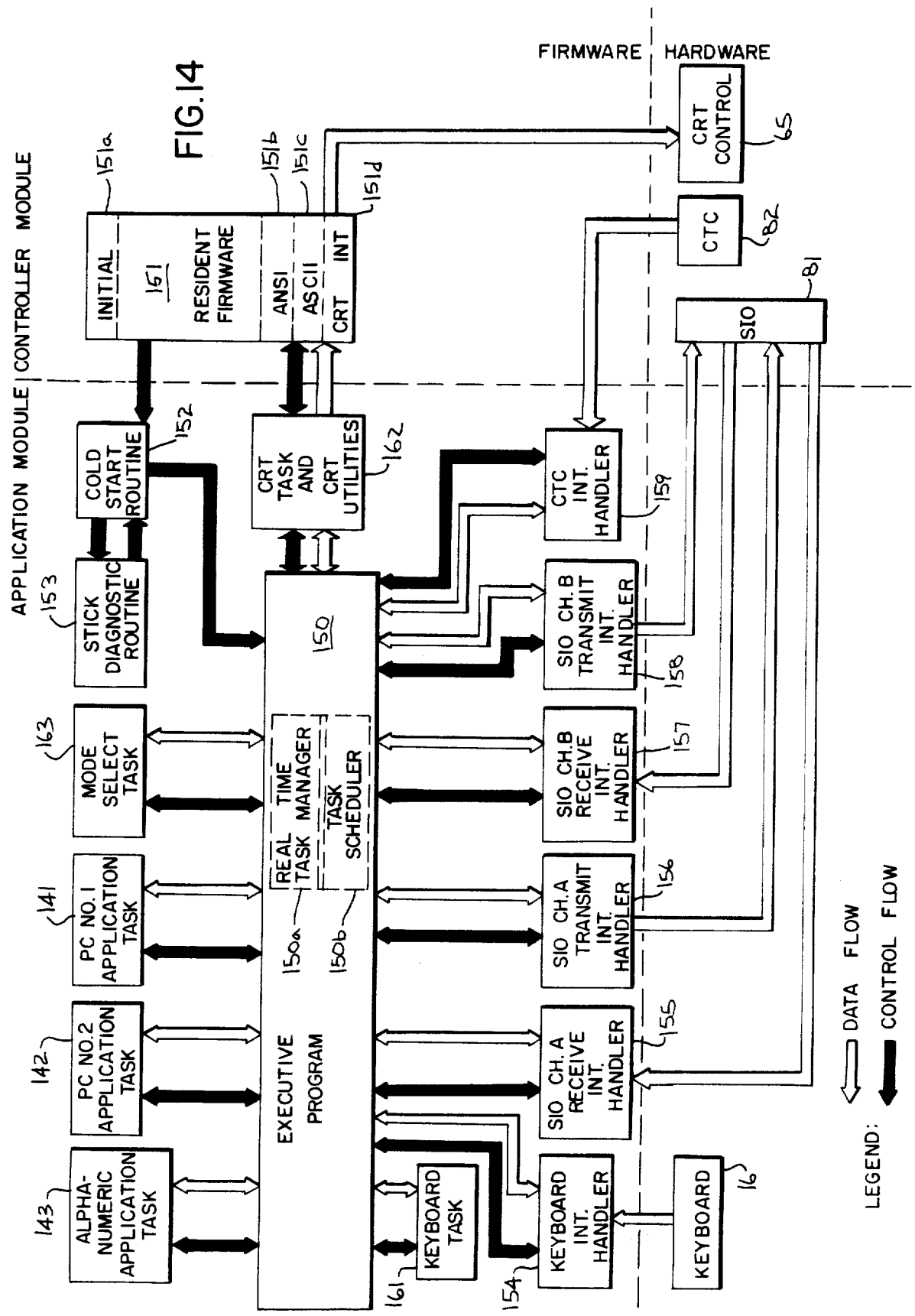
FIG. 14 is a block diagram of a firmware operating system and its relationship to the hardware in the terminal of FIG. 1.

The executive program 150 represented in FIG. 14 is a REX-80 executive program, which is commercially available from Systems and Software, Inc., Downers Grove, Il. Besides the executive program 150, the vendor provides instructions for the development of specialized program units called tasks. Each task is a program in itself that directs all of the functions of the microprocessor 68 during a particular time in which the task is in an active or running state. The executive program 150 uses certain parameters, referred to as initial task descriptors (ITD's), which are provided by the task originator and which are used to build up task control blocks (TCB's). Thus a task can be represented in a linked list or queue by an address of a task control block containing the unique information characterizing the particular task. One item of information is the priority of the task; another important item of information is an event control byte or a word. This event control byte or word is based upon an event flag that signals a precondition determining whether the task is ready to be scheduled for the running or active state.

Examples of tasks in this particular operating system include a keyboard task 161, a CRT task 162 and a mode select task 163 seen in FIG. 14, and a system initialization task that has not been shown in FIG. 14. The system initialization task, the keyboard task 161 and the CRT task 162 are all assigned a priority of seven, while the mode select task is assigned a priority of six. Of the tasks with the highest priority the system initialization task is executed first and is then suspended, until power to the system is recycled. Tasks are scheduled to be run by portions of the executive program 150 known as the real-time task manager 150a and task scheduler 150b which examine the information in the TCB's to determine whether a task is ready to be run, and to determine whether certain preconditions or events have occurred.

The executive program 150 also provides management of what are referred to as interrupt channels and software channels, and references to these will be seen in the task firmware provided in the Appendices listed in Table 4 below. Interrupt channels enable communication between a hardware device such as the keyboard 16 and the keyboard task 161. Software channels enable communication between keyboard task 161 and the CRT task 162 on one end and the mode select task 163 and the application tasks 141-143 at the other end. The interrupt channels are defined by parameters grouped in initial channel descriptors (INTCB's), which the task originator provides for the number of interrupt channels required for the system. Initial parameters for the software channels are tabulated in initial software channel descriptors (IFSCD's) to be provided by the task originator. The executive program 150 uses this information to build initial task control blocks (INTCB's) and initial software control blocks (INTSCB's) analogous to the TCB's described earlier. The executive program 150 then provides management of interrupt channel service requests and software channel service requests, receiving such requests and placing a pointer to the appropriate INTCB or INTSCB in a queue. The executive program also provides message control blocks (MCB's) which are blocks of data including the information sought to be transferred through the interrupt and software channels. The MCB's themselves are not transferred, but rather their addresses are transferred into and out of memory locations defined as being within the interrupt and software channels.

As an example of the application of the REX-80 operating system to the present invention, an interrupt channel is provided for communication between the keyboard 16 and a keyboard task 161. When the keyboard 16 generates an interrupt signal a keyboard interrupt handler routine 154 is executed to take the encoded value of the key and then place it into the MCB related to the interrupt channel. As a result the keyboard-encoded value will be available from the MCB to the keyboard task 161, which translates such values. The keyboard task 161 then uses two software channels to communicate with other tasks, one channel being used to transfer key values, and the other channel being used for replacing the current translation table used in the keyboard task 161 at the request of other tasks in the operating system. Another software channel is used to send information to the CRT task 162 for eventual display on the screen of the CRT 9.

The SIO interrupt handler routines 155-158 in FIG. 14 are part of the firmware operating system which interrupt the executive program 150 and its associated tasks. Blocks 155 and 156 represent the receive character interrupt handler and the transmit interrupt handler for the channel connected to port A of the SIO 81. A set of these routines is provided for both the port A channel and the port B channel as represented by blocks 157 and 158 in FIG. 14. The requirements for these blocks of firmware are outlined in Z80-SIO Technical Manual, and will be recognized by those skilled in the art as standard routines associated with this chip. Other SIO handler routines not shown in FIG. 14, but included in the application memory firmware, are a receive error interrupt handler routine and an external status interrupt handler routine.

As represented by block 159, a CTC interrupt handler is also provided to handle interrupts generated by the CTC chip 82. The REX-80 executive program 150 provides the option of using an interrupt handler within the program 150 itself, or providing a different timer interrupt handler. For clarity, the interrupt handler has been shown apart from the executive program 150, however, the operating system herein avails itself of the timer interrupt handler provided within the executive program 150.

The resident firmware 151 in FIG. 14 includes a resident initialization routine, 151a, an ANSI translation routine 151b, an ASCII display routine 151c, and a CRT interrupt processing routine 151d. The ANSI translation routine 151b and the ASCII display routine 151c, which functions as a subroutine by the ANSI translation routine, direct the microprocessor 68 in translating characters for display on the CRT 9. The CRT interrupt processing routine 151d is executed in response to the CRT interrupt that occurs every 160 milliseconds to provide a 1.5 millisecond window for access to the VTC controller 96 and the display RAM 100. It is at this time that characters are written into the display RAM 100 at a particular address—to be displayed later at the screen location for that address. The display attribute for each character is stored in the di.splay RAM 100 with its associated bits of character data. The resident display routines 151b-151d are called up through the CRT task and a number of CRT utility routines represented by block 162 in FIG. 14 and a table of vector addresses pointing to the resident display routines 151b-151d.

The resident initialization routine 151a contains the first instructions to be executed by the microprocessor 68 after power is supplied to the terminal 1. The start of this resident firmware program is represented by start block 130 in FIG. 9. As represented by process blocks 131 and 132, the microprocessor 68 then executes further resident firmware instructions to initialize and run diagnostics for the hardware in the controller module 1a, including the resident memory 45 (FIG. 2), the PIO chip 91 (FIG. 7), the VTC chip 96 (FIG. 8a), the display RAM 100 (FIG. 8a), the CTC chip 82 (FIGS. 5 and 14) and the SIO chip 81 (FIGS. 5 and 14). Next, as represented by decision block 133 in FIG. 9, further resident firmware instructions are executed to read test data from locations 1000 and 1001 (hexadecimal) in the application memory 26 to determine whether an application module 14 is connected to the controller module 1a. If the results of this decision are negative, the microprocessor 68 exeoutes further resident firmware instructions to display the message "FUNCTIONING" on the CRT 9, and then exeoutes further resident firmware instructions that are organized in a "CRT Monitor Mode Routine," represented by process block 134. In this mode of operation, the SIO 81 is initialized with a baud rate and parity selected through the DIP switches 80 and is serviced through interrupt service routines included in CRT Monitor Mode sequence of instructions. During the execution of the CRT Monitor Mode Routine, the controller module 1a acts as a standard ASCII terminal capable of displaying any received serial ASCII characters.

Referring to FIG. 14, the low address locations in the application memory 26 are occupied by a block of COLD START routines 152, which block includes a header with the test data which is checked in decision block 133 of FIG. 9. When the connection of an application module 14 is detected by checking this test data, the microprocessor 68 jumps to a sequence of instructions beginning at line 1006 (hexadecimal) in the application memory 26 to execute a group of STICK DIAGNOSTIC routines represented by block 153. These routines are executed to check the integrity of the EPROM and RAM memory chips in the application memory 26 before the processor 43 is switched to operate under instructions from that memory 26. Provided the STICK DIAGNOSTIC routines are successfully completed, the microprocessor 68 executes a return to the COLD START routines 152 and then executes a jump to the first instruction in the executive program 150. This begins the initialization of the executive program 150 to the extent that the task control blocks are formed in memory 26 for the system initialization task, the keyboard task 161, the CRT task 162 and the MODE SELECT task 163. The initialization sequence directed by the executive program 150 is provided with an intermission in which the microprocessor 68 jumps back to the COLD START routines 152 to initialize a table of hardware interrupt vectors, mainly relating to the SIO 81, and to initialize a 10 millisecond interrupt timer provided by the CTC chip 82. SIO channels A and B are also reset before returning to the executive program 150 to set up the interrupt and software channels described earlier. Part of the initialization for the interrupt and software channels is provided by a system initialization task which is the first task to run. This task is then suspended, and will not run again until power is recycled, or some other measures taken to restart the running of the executive program 150. After an operating environment has been established during the first run cycle through the executive program 150, the MODE SELECT task 163 will be scheduled and run.

Figure 10A:
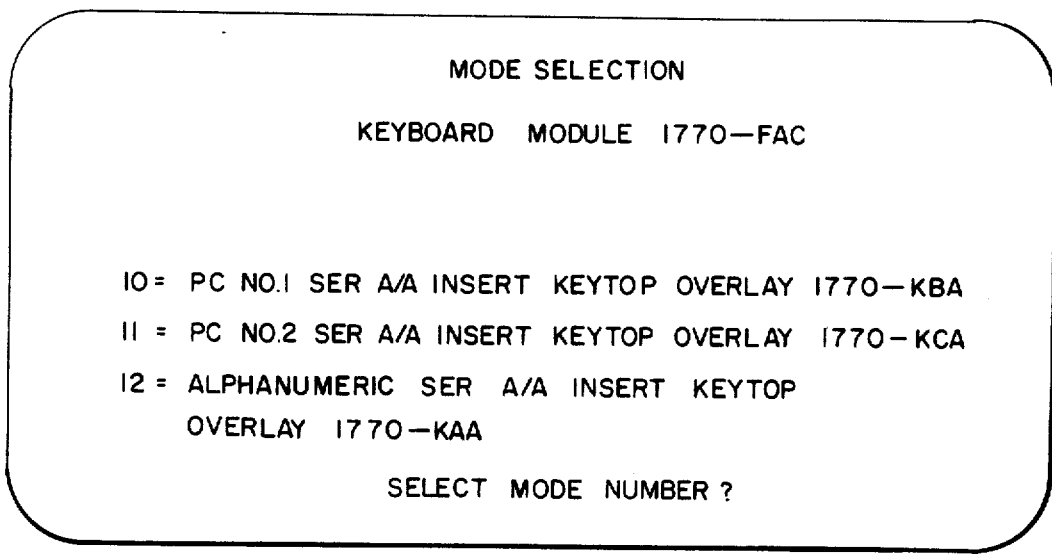
FIGS. 10a-10c are elevational views of the CRT screen of the terminal of FIG. 1 with prompt messages displayed.

Referring to FIG. 9, the detection of the application module 14 in decision block 133, results in the display of a mode selection menu represented by display block 135 in FIG. 9, and seen in FIG. 10a. The MODE SELECTION task 163 calls the CRT screen 9a to display a message "DIAGNOSTICS PASSED" if power has just been turned on and diagnostics have been successfully executed, and to call up the data necessary to display the messages seen in FIG. 10a. The data for these messages is stored in a data file that identifies the application module 14 with its contents. As seen in FIG. 10a, the application module 14 is identified as KEYBOARD MODULE 1770-FAC. The FAC keyboard file contains data for displaying the message "MODE SELECTION" in intensified reverse video and centered left to right on the CRT screen 9a as seen in FIG. 10a. Below this the identifier "KEYBOARD MODULE 1770-FAC" is centered left to right and at the bottom of the screen centered left to right is the message "SELECT MODE NUMBER?" where the "?" is displayed in intensified video with a blinking attribute to attract the attention of the operator. Below the first two messages are three messages that seek a mode selection response from an operator. As seen in FIG. 6, the application memory 26 stores the PC No. 1 application task 141, the PC No. 2 application task 142, and the ALPHANUMERIC application task 143, and each of the messages, in FIG. 10a identifies one of these applications. To the right of each application title is the series and revision level of the application firmware, such as "SER A/A," for example. To the right of this information is data identifying the keyboard overlay 19a–19c for each application. To the left of the application data is a code number from ten to twelve (hexadecimal) which is the mode select number for the respective application. And below the three messages is the "SELECT MODE NUMBER?" message which seeks a response from the operator.

Referring again to FIG. 9, the mode selection menu is displayed at powerup and every time the MODE SELECT key is entered from the keyboard 16 as represented in manual input block 136. As seen in FIGS. 11 and 13, the MODE SELECT key is included in each of the overlays 19a–19c, so that it is available regardless of the current mode of operation. After displaying the mode selection menu represented by display block 135, the microprocessor 68 looks for an interrupt generated by a key entry as represented by process block 137. When the interrupt occurs the microprocessor 68 checks the keyboard input through key processing sequences in the mode selection task 163, to determine whether the code entered is 10, 11 or 12 (hexadecimal) as represented by decision blocks 138–140 in FIG. 9. When a valid application entry has been found, an initialization sequence in the mode selection task is executed to prepare for the running of the selected application task. For a code 10, the microprocessor begins initialization to execute the PC No. 1 application task represented by process block 141. For code 11, the microprocessor initializes for execution of the PC No. 2 application task represented by process block 142. For code 12, the microprocessor 68 initializes for execution of the ALPHANUMERIC application task as represented by process block 143. If a valid code number is not detected, the microprocessor 68 returns to wait for another interrupt as represented by process block 137. If the microprocessor 68 is running one of the application tasks 141–143, and it is desired to change modes of operation, the user may operate the MODE SELECT key, and the microprocessor 68 will return to the COLD START routines and follow the sequence outlined above to reach the MODE SELECT task 163.

The information needed to initialize the respective application tasks is maintained in an information table that is part of the FAC keyboard file included in the Appendix E herein. Each entry corresponds to a respective application task and includes a number of items of information such as the address of the prompt string data for displaying the three messages in the middle of the screen 9a in FIG. 10a. Other items in each table entry are the encoded values for the valid mode selection and the entry point address for the respective application task. In this embodiment, each programmable controller programming function is formulated in a single application task. However, it should be apparent that more than one application task could be devised for each programmable controller with which the industrial terminal 1 can be used.

Referring to FIG. 11, when the PC No. 1 mode of operation is selected, and the PC No. 1 application task is initialized and running, program instructions and operating data for the PC No. 1 programmable controller are entered through the keyboard 16 with the assigned keyboard symbols 21 seen in FIG. 11. The larger group of keyboard symbols 21 on the left represent programmable controller operations while the digit symbols 0–9 on the right are used for entering operand data. In this mode of operation, a programmable controller application program of the type seen in Appendix A and familiar to those skilled in the art, is entered through the keyboard 16 for display on the CRT screen 9a. As elements of the ladder diagram are input, they are transmitted through serial I/O port B and serial channel 63 which is connected to the main processor in the PC No. 1 programmable controller (not shown). This controller includes a special program loader processor that receives keyboard characters and sends back output characters to be coupled to the CRT display unit 9. Thus, when the industrial terminal 1 is emulating a program loader for the PC No. 1 programmable controller, functions such as formatting and editing the data for display are carried out by the programmable controller itself. This is more fully explained in Grants et al, U.S. Pat. No. 4,070,702, issued Jan. 24, 1978.

When the PC No. 1 application task has been selected in response to the prompt messages on the CRT screen 9a, the mode selection task builds up the application task from the information table entry in the FAC keyboard file, which includes the entry address to the PC No. 1 application task. This task begins with reading the DIP switches 80 to determine baud rate and parity for the communication channel 63. Then, assuming that a remote mode of operation is not being implemented, the addresses of a set of SIO interrupt routines, modified from the routines in labels 155–158 of FIG. 14 to be consistent wilh the serial protocol of the PC No. 1 controller, are loaded into a table for future access. The interrupt routines include an SIO channel A transmit buffer empty routine, an SIO channel B receive character routine, an SIO channel B receive interrupt routine, an SIO channel B read status routine and an SIO channel A external status interrupt routine. These are hardware driver routines of the type described in the Z-80 SIO Technical Manual, cited above. The PC No. 1 application task firmware includes a data file that has two initial subtask descriptors for building two subtasks. A character processing subtask is assigned a priority of five, while a keyboard processing subtask is assigned a priority of six. The keyboard processing task provides a sequence of instructions to the microprocessor 68 for interpreting sequences of key inputs and translating them to characters which can be displayed and sent over the serial channels via the character processing task.

Referring to FIG. 11, the keyboard 19a for the PC No. 1 application includes command functions such as DISPLAY and SEARCH, which are used in key sequences to build commands such as those in the following table 1.

TABLE 1

| Key Sequence | Function |
| --- | --- |
| [SEARCH] [5] [9] [10] | Remote selection or run/monitor mode |
| [SEARCH] [5] [9] [1] | Remote selection of text 1 monitor mode |

TABLE 1-continued

| Key Sequence | Function |
| --- | --- |
| [SEARCH] [5] [9] [2] | Remote selection of program mode |
| [DISPLAY] [2]-[DISPLAY] [8] | Selection of bond rate from 110 bond to 9600 bond |
| [SEARCH] [4] [4] | Ladder diagram |
| [SEARCH] [4] [6] | Contact histogram, continuous |
| [SEARCH] [4] [7] | Contact histogram, update |

The key labeled RUNG is operated in conjunction with keys having the vertical arrows to determine which rungs of the ladder diagram are to be displayed. The INSERT and REMOVE keys are used in key sequences to edit instructions such as −] [−, −]/[−, −( )− and −(/)−, which are presented in this symbolic form on the keyboard overlay 19a,b.

When keyboard inputs are made by operating the keyboard 16 through its associated overlay 19a, the encoded keyboard data words are coupled to a buffer during execution of a keyboard driver routine 154, discussed earlier. The buffer is accessible when the microprocessor 68 is running under the PC No. 1 keyboard subtask. This task is used, in lieu of the general keyboard task 161, for the PC No. 1 application only. The PC No. 1 keyboard subtask employs a state processor, to be explained more fully below, to interpret and process to a limited extent, some of these keyboard inputs. The processed inputs include the DISPLAY, SEARCH, TTY and CANCEL COMMAND keys and certain sequences including both the DISPLAY and COMMAND keys. Other key inputs are translated to characters in the PC No. 1 character format and then sent directly to the PC No. 1 processor without further interpretation as well as being saved for display on the CRT under the direction of the PC No. 1 character processing task.

The PC No. 1 character processing subtask handles characters received over the serial channel 63 from the PC No. 1 processor, as well as characters received over the general purpose serial channel 62 and characters sent to the PC No. 1 processor as outlined above. When the microprocessor 68 is directed by this task, it utilizes communications over the serial channel 63 by checking for characters from the PC No. 1 main processor and, if necessary, sending a bit pattern and waiting for a response. When communication has been established, the microprocessor 68 enters a main loop where it first checks to see if the CRT 9 is on and functioning. It then sends any available keyboard character to the PC No. 1 main processor. After checking a status condition it then further processes any available characters from the various communication sources described above.

In the PC No. 2 mode of operation using the keyboard overlay 19b of FIG. 12, a wider range of functional commands including forced I/O commands, FORCE ON and FORCE OFF, a "master control relay" (MCR) command, a "zone clear" (ZCL) command, a "get byte" (−[B]−) command, a "limit test" (−[L]−) command, an immediate input (−[I]−) command, and an immediate output (−[IOT]−) command can be entered through the keyboard 16. The MCR and ZCL commands are equivalent to relay logic instructions which allow a part of a user's controller program to be skipped under certain conditions. The "get byte" and "limit test" instructions allow transfer of data to and from a data table storage area in a programmable controller, and were previously disclosed in Struger et al, U.S. Pat. No. 4,158,226, issued June 12, 1979. The immediate I/O instructions are disclosed under the symbols XCF, XOF and OEF in U.S. Pat. No. 4,172,289 issued Oct. 23, 1979 and assigned to the assignee of the present invention. In the PC No. 2 mode of operation, the microprocessor 68 in the industrial terminal 1 performs the full range of formatting and editing functions for a ladder diagram program for a programmable controller.

Figure 15:
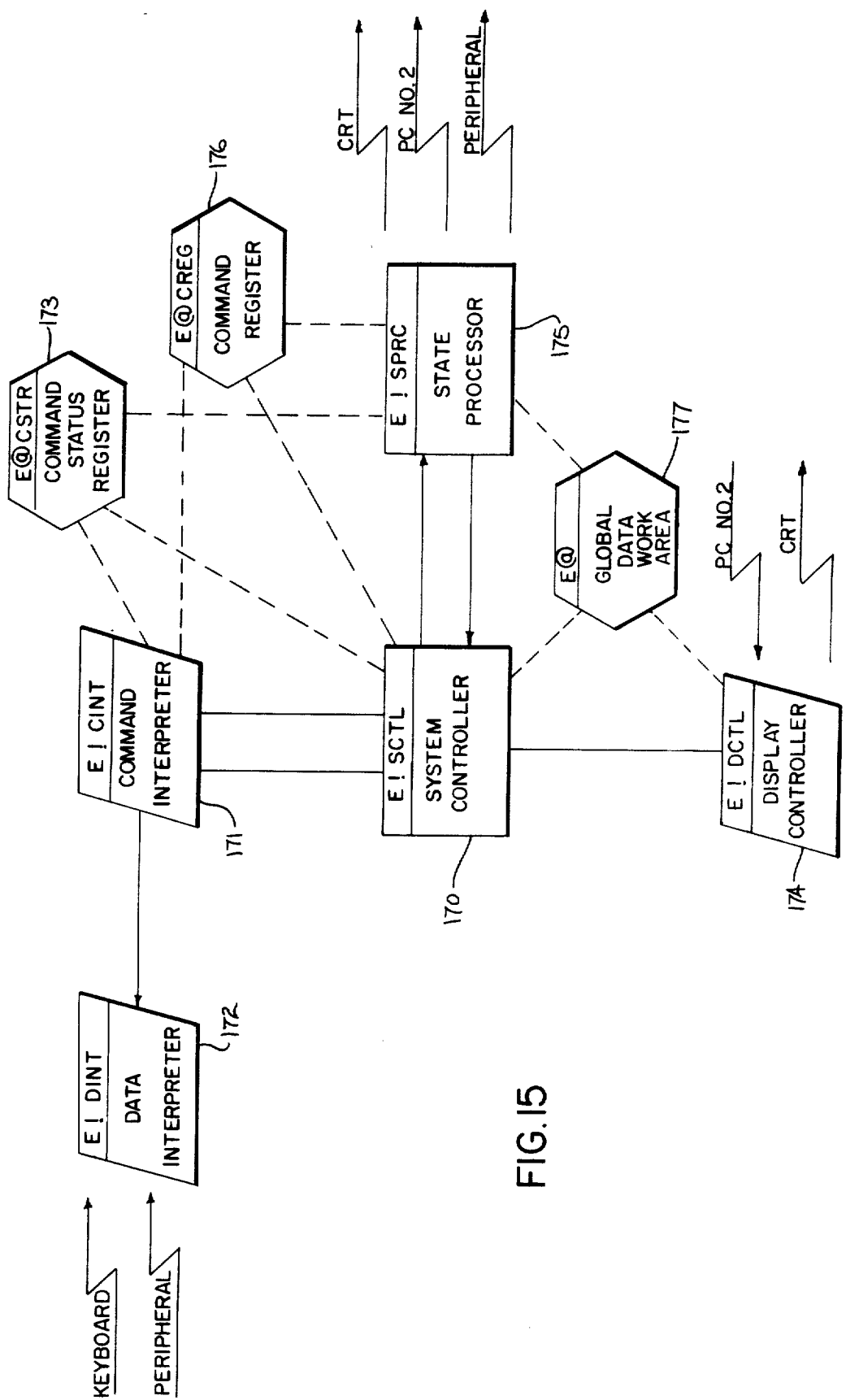
FIG. 15 is a block diagram of the main parts of a PC No. 2 application task in the firmware operating system of FIG. 14.

Referring to FIG. 15, the basic organization of the PC No. 2 application task is seen in more detail. After task buildup during mode selection, the PC No. 2 application task is initialized, including resetting registers in the SIO 81 and reading baud rate and parity values indicated by the DIP switches 80 for serial port A and serial channel 62. Next, the microprocessor 68 enters a PC No. 2 system controller loop represented by block 170 in FIG. 15. While the instructions are set forth in the Appendix, they are repeated here in Table 2 for convenience of reference.

TABLE 2

| Location | Contents | Label | Mnemonic | Comments |
| --- | --- | --- | --- | --- |
| 00F1 | | E!SCTL | | ;PLC-2 SYSTEM CONTROLLER |
| 00F1 | CD0000 | E | CALL E!CINT | ;GET USER COMMAND |
| 00F4 | 3812 | | JR C,CHKNOT | ;IF NONE, DO DISPLAY |
| 99F6 | 210000 | | LD HL,E@CSTR | ;CHECK FOR RUNG DISPLAY DISABLE BEFORE CLEARING |
| 00F9 | CB56 | | BIT RLDDIS, (HL) | ;CLEAR IF RUNG DISPLAY ACTIVE |
| 00FB | CC0000 | | CALL Z,E!CR21 | ;CLEAR THE ERROR DISPLAY ROW (ROW 21) |
| 00FE | CD0000 | | CALL E!SPRC | ;EXECUTE COMMAND |
| 0101 | 210000 | | LD HL,E@CSTR | ;GET ADDRESS OF STATUS FLAGS |
| 0104 | CBEE | | SET OUTBLK, (HL) | ;SET OUTPUT BLANKS FLAG FOR DISPLAY |
| 0106 | 18E9 | | JR E!SCTL | ;CONTINUE LOOP |
| | | CHKNOT | | ;CHECK FOR DISPLAY UPDATE |
| 0108 | 3A0000 | | LD A,(E@CSTR) | ;GET THE STATUS FLAGS |
| 010B | CB57 | | BIT RLDDIS,A | ;CHECK FOR DISPLAY DISABLE |
| 010D | CC0000 | | CALL Z,E!DCTL | ;UPDATE DISPLAY IF NOT |
| 0110 | 210000 | | LD HL,E@SCTR | ;GET THE ADDRESS OF |

TABLE 2-continued

| Location | Contents | Label | Mnemonic | Comments |
|----------|----------|-------|----------|----------|
| 0113 | CBAE | | RES OUTBLK, (HL) | THE FELAGS ;RESET THE BLANKS OUTPUT FLAG |
| 0115 | 18DA | | JR E!SCTL | ;CONTINUE LOOP |

It is assumed for this discussion that the keyboard and CRT tasks 161 and 162 have been installed, but are not active. The keyboard task 161 will have processed keyboard inputs that are available to the microprocessor 68 during this application task. Therefore, in the system controller loop, the microprocessor 68 will first call a command interpreter sequence labeled E!CINT and represented in block 171 to interpret keyboard input information. This sequence will, in turn, cause a call to a data interpreter sequence E!DINT represented in block 172 of FIG. 15. The data interpreter sequence is executed to get the input data and determine first, whether it is a key input or an input from a peripheral device, and second, whether any key input is in a programmable controller character or in standard ASCII character. These checks are necessary because the terminal 1 may be connected to peripheral devices through serial channel 62, and may be operated in a PC No. 2 application task with the overlay 19c of FIG. 13, rather than the overlay 19b of FIG. 12. If a command with programmable controller characters is detected, the microprocessor 68 will jump to a line on a lookup table to determine a command class. After saving this command class in a command register, E@ CREG (block 175 FIG. 15) the microprocessor 68 is directed back into the command interpreter sequence E!CINT. If, as a result of the checks made earlier, an ASCII command is detected, such commands will be interpreted and results stored in an ASCII buffer for later display.

Referring to Table 2 above, if no command is found, the microprocessor 68 jumps to the CHKNOT portion of the sequence, and particularly to the display controller block 174, which is labeled E!DCTL. The display controller block 174 is the portion of the PC No. 2 application task firmware which interprets programmable controller type instructions and associated data for display in the ladder diagram format seen in Appendix A. Thus the display controller block 174 provides the firmware instructions for coupling character data to the display RAM 100 for eventual display on the CRT screen 9a. When a command is found during the first portion of the system controller block 170, however, it is executed before the display controller block 174. The microprocessor 68 utilizes a set of state tables and action sequences in the PC No. 2 application firmware, which are referred to collectively as a state processor 175. The microprocessor 68 also utilizes a global data work area 176 to store the status of the PC No. 2 processor, excluding its current user program and I/O table. Through the state tables, commands are mapped to various execution routines, which can be combined sequentially in carrying out a single command. After executing the command in the state processor block 175 labeled E!SPRC, the microprocessor 68 sets a "blanks output" flag in the status flag register E@CSTR (block 173, FIG. 15). Both the command status register 173 and the command register 175 are actually a part of the global data work area, but these have been separately shown for a better understanding of Table 2. When the CRT 9 has been updated through execution through the display controller block 174 the "blanks output" flag is reset to enable faster screen update. Thus it will be seen that the processing of commands has priority over the update of the CRT 9, the latter being performed when commands are not available for execution.

As seen in FIG. 15, the command interpreter E!CINT and data interpreter E!DINT blocks 171 and 172 receive inputs from the keyboard 16 and from peripheral devices. The display controller E!DCTL couples ladder diagram information from the processor of the PC No. 2 programmable controller to the screen 9a of the CRT 9. When a command has been obtained, and is executed through the state processor E!SPRC, it may be necessary to interpret further data, e.g. operand data, which is also entered through the keyboard and the peripheral as represented by the arrows in FIG. 15. The state processor action sequence would then call the data interpreter 172 to interpret the data. The execution of commands through the state processor generates outputs to the CRT 9, to the PC No. 2 main processor and to peripheral devices.

The state tables through which commands are executed by the PC No. 2 application task firmware includes a table for each of thirty states 0–29. The PC No. 2 state execution actions are designated by labels from E!A-O–E!A-99. The following table contains the current execution sequences with certain labels yet to be assigned.

TABLE 3

| Label | STATE ACTIONS Action |
|-------|----------------------|
| E!A-1 | Rung Up |
| E!A-2 | Rung Down |
| E!A-3 | Cursor Left |
| E!A-4 | Cursor Right |
| E!A-5 | First Rung |
| E!A-6 | Last Rung |
| E!A-7 | First Instruction of Rung |
| E!A-8 | Last Instruction of Rung |
| E!A-9 | Force Function Allowed |
| E!A-10 | Insert Force Function |
| E!A-11 | Remove Force Function |
| E!A-12 | Clear all Force Functions |
| E!A-13 | Multiple/Single Rung Display |
| E!A-14 | Latch Set/Clear |
| E!A-15 | Remove Rung |
| E!A-16 | Remove Instruction |
| E!A-17 | Enter Instruction Type 1 |
| E!A-18 | Initialize Entry of Instruction Type 2 |
| E!A-19 | Build Address/Operand for Type 2 and Enter |
| E!A-20 | Enter Instruction Type 2 |
| E!A-21 | Insert Instruction Type 1 |
| E!A-22 | Insert Instruction Type 2 |
| E!A-23 | Insert Rung Initialization |
| E!A-24 | Insert Data Operand |
| E!A-25 | Abort Instruction Entry |
| E!A-26 | Clear Memory Initialization |
| E!A-27 | Clear Memory |
| E!A-28 | Search for Instruction Initialization |
| E!A-29 | Build Instruction for Search |
| E!A-30 | Search for Type 1 Instruction |
| E!A-31 | Recursive Search |
| E!A-32 | Search for Address Initial- |

TABLE 3-continued
STATE ACTIONS

| Label | Action |
| --- | --- |
| | ization |
| E!A-33 | Terminate Search Mode |
| E!A-34 | Display Number of Peripheral Errors |
| E!A-35 | Contact Histogram (paging) |
| E!A-36 | Contact Histogram (continuous) |
| E!A-37 | Baud Rate Change |
| E!A-38 | Display Peripheral Error Initialization |
| E!A-39 | Display Peripheral Error |
| E!A-40 | Cassette Load/Dump |
| E!A-41 | Cassette Verify |
| E!A-42 | Automatic Report Generation |
| E!A-43 | Binary Tape Dump |
| E!A-44 | Binary Tape Load |
| E!A-45 | Binary Tape Verify |
| E!A-46 | Ladder Diagram Dump |
| E!A-47 | Parameter Table Adjustment Initialization |
| E!A-48 | Parameter Table Adjustment |
| E!A-49 | Display Error from Parameter Table Adjustment |
| E!A-50 | Terminate Parameter Table Adustment |
| E!A-51 | On Line Data Change Initialization |
| E!A-52 | On Line Data Change Allowed |
| E!A-53 | Get On Line Data |
| E!A-54 | Enter on Line Data Change into Data Table |
| E!A-55 | Display Zeroes with Cursor on First (On Line Data Change) |
| E!A-56 | On Line Data Change Cursor Up |
| E!A-57 | On Line Data Change Cursor Down |
| E!A-58 | On Line Data Change Cursor Left |
| E!A-59 | On Line Data Change Cursor Right |
| E!A-60 | On Line Data Change to Next Operand |
| E!A-61 | Invalid Key |
| E!A-62 | Invalid Key if not Status Change Command |
| E!A-63 | Exit Parameter Table Adjustment if not Program Mode |
| E!A-64-E!A-69 | Not Assigned |
| E!A-70 | Contact Histogram and Bit Address Entry |
| E!A-71-E!A-72 | Not Assigned |
| E!A-73 | Display Command on Row 22, Column 0 |
| E!A-74 | Switch to Alphanumeric Overlay |
| E!A-75 | Delete Message |
| E!A-76 | Store Message |
| E!A-77 | Print Message |
| E!A-78 | Report Message |
| E!A-79 | Print Index of Message Files |
| E!A-80 | Invalid Ascii Command |
| E!A-81 | Display Command on Row 22, Column 7 |
| E!A-82 | Clear Row 22 |
| E!A-83 | Display Command on Row 22, Column 15 |
| E!A-84 | Insert Rung Output Type 1 |
| E!A-85 | Insert Rung Output Type 2 |
| E!A-86 | Illegal Output Insert |
| E!A-87 | Illegal Output Remove |
| E!A-88 | Insert Before Cursor Instruction Type 1 |
| E!A-89 | Insert Before Cursor Instruction Type 2 |
| E!A-90-E!A-97 | Not Assigned |
| E!A-98 | Character Cursor Left |
| E!A-99 | Character Cursor Right |

Commands such as those described for the PC No. 1 application task, can also be executed when the terminal 1 is operating in the PC No. 2 application mode. Based on the command class saved for command clearing the E!CINT block 171, the microprocessor 68 jumps to a line in one of the thirty state tables which contains the command class, the action to be executed and the next state, corresponding to another state table, to which the microprocessor 68 is directed.

If, for example, the instruction —]/[— XXX (meaning examine contact status for contacts closed at a three place actual address represented by the X's) is entered through the keyboard 16 as an enter instruction command, the microprocessor 68 would jump to a line in the state 1 table assigning sequence E!A-18 for execution and a next state of five. As seen in Table 2 action E!A-18 is an action for initializing the entry of a type 2 instruction, which is defined as an instruction having an operand, as opposed to a type 1 instruction which does not have an operand. After action sequence E!A-18 is executed, the microprocessor 68 would return to state five and look for the next command. Since the XIC (examine contacts for closure) command required an operand the next entry should be a digit from 0–9 which will be mapped to a line in state table five to execute action sequence E!A-19 in Table 2 to build the address/operand for a type 2 instruction. In state five, the lines for command classes 0–9 corresponding to keep 0–9 are all assigned sequence E!A-19 for execution and are all assigned a next state of one. The E!A-19 execution sequence processes all the octal digits in the operand so that the microprocessor 68 will have completed the entry of the XIC XXX instruction.

Although not listed by groups, certain execution actions are related to one another. Actions E!A-28–E!A-33 are main search actions which are executed in response to commands including the SEARCH key in the key sequence. These are rather involved actions for searching an application program of the type seen in Appendix A to find one or more specific user program instructions. Other actions such as those with labels E!A-14 to E!A-25, E!A-84 to E!A-89, E!A-98 and E!A-99 are executed to enter and edit various kinds of programmable controller instructions. Execution actions E!A-1 to E!A-8 and E!A-13 are executed to display program instructions in the ladder diagram format of Appendix A in response to commands including the DISPLAY key. Still other execution actions provide cursor operation, contact histogram and communication with peripheral devices. The advantage of the state processor arrangement is that future commands can be implemented by rearranging only a small portion of the firmware that includes the state tables, and providing a small number of additional execution actions.

Part of executing an instruction entry command involves transferring it to the main memory of the PC No. 2 processor and another part includes displaying the instruction on the CRT screen 9a. To obtain the necessary data for display, the microprocessor 68 executes the display controller block 174. This block includes a display rung sequence labeled E!RDSP in the Appendices for examining each rung in a copy of the application program that is stored in the application thereof. Each instruction on the rung must be examined for its function within the rung, whether it is the first input instruction, whether it is a branching instruction, a first input in a branch etc. This is accomplished through a relatively short set of state tables, which provide convenient mapping to the appropriate rung action sequences. These sequences call further sequences for displaying individual instructions, and a number of such instruction display sequences are required to handle the various general types of programmable controller instructions grouped by format. These routines utilize an E!IDSP individual display sequence and supporting subroutines and action sequences to display individual instructions in the rung format. Instructions are entered through the keyboard 16 of the application module 14 and stored in the application memory 26 in an instruction queue, in which sixteen rungs of ladder diagram information are arranged. Where the instructions are entered in the ladder diagram is determined by the current rung being indexed and the position of the cursor, and these can be manipulated through commands employing execution actions E!A-1 through E!A-8 and E!A-13 mentioned above. The display controller sequence E!DCTL is periodically interrupted by the CRT interrupt processing routine in its resident firmware, so that rungs in the instruction buffer are transferred a character at a time to the display RAM 100.

Referring to FIGS. 9 and 13, the industrial terminal 1 can be used as a standard computer terminal when operated in the ALPHANUMERIC application mode with the overlay 19c disposed over the keyboard 16 of FIG. 1. Communication will be via the standard RS-232-C serial channel 63 connected to the B port on the SIO chip 81 in FIG. 5. When the code "12" is detected in decision block 138 of FIG. 9, the microprocessor jumps to a communication options routine 144 within the ALPHANUMERIC application task 143 to call up data for the prompt messages seen on the CRT screen 9a in FIG. 10b. A heading displayed at the top of the screen 9a reads "COMMUNICATION OPTIONS ALPHANUMERIC MODE," and this heading is displayed in intensified reverse video. The parameters of BAUD RATE, PARITY, DUPLEX, CHANNEL C (CRT channel), CURSOR, auto line feed on return and CONTROL CODE DISPLAY are displayed with a corresponding selection number from one to seven. On power up, values to the right of these parameters are the default values determined by the applications module firmware and the setting of the DIP switches 80. For example, the default baud rate is 9600 baud. The bottom of the screen 9a in FIG. 10b, the message "ENTER NUMBER FOR OPTION TO BE CHANGED" is displayed in one line. After the connector "OR" in the next line, another phrase "ENTER IN [RETURN] TO SELECT VALUES DISPLAYED" is displayed.

Figure 10B:
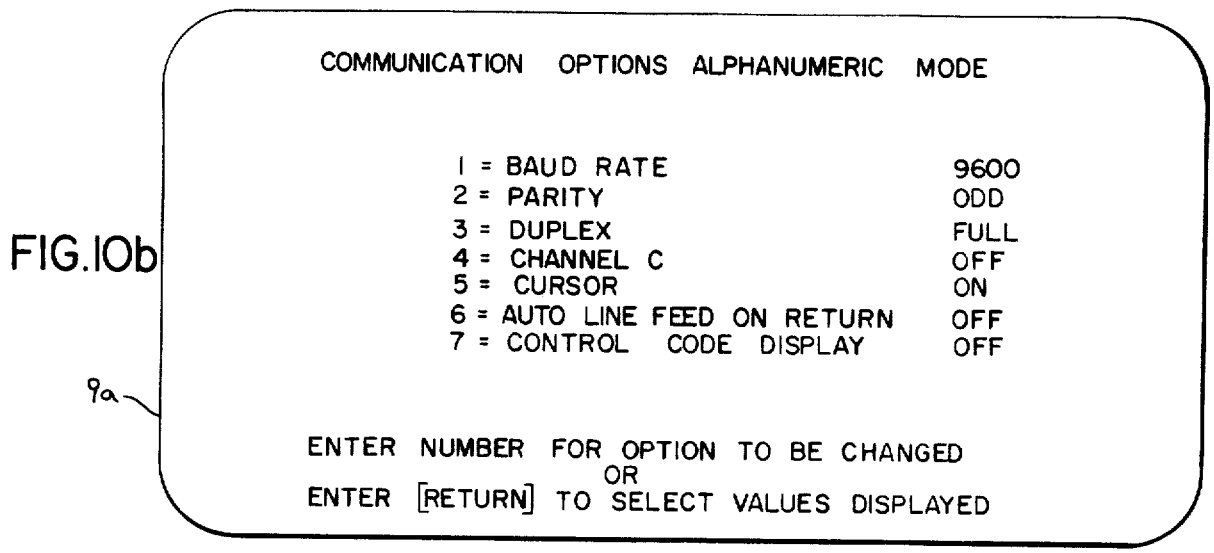
Figure 10C:
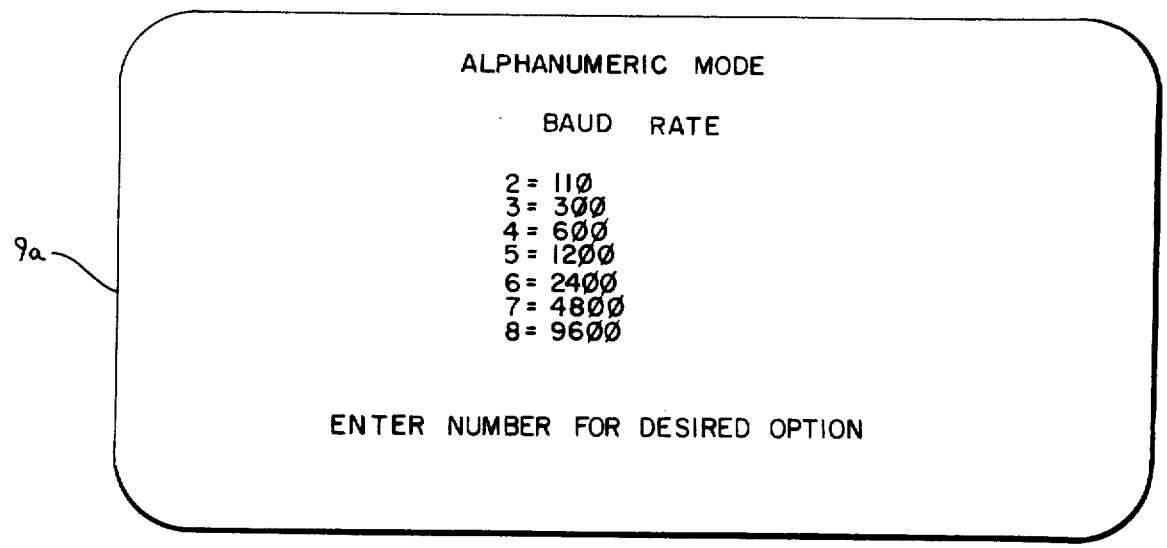

The ALPHANUMERIC task includes a key processing sequence for receiving and translating key inputs as a series of states. Each key is therefore mapped into a corresponding one of nine state execution routines. The first state (state 0) corresponds to displaying the full option screen seen in FIG. 10b, to allow the user to change a particular communication option. Assuming that a "1" key is touched, the second state is entered, when the message as seen in FIG. 10 is displayed. The screen 9a is headed by the phrase ALPHANUMERIC MODE and shows that "BAUD RATE" has seven options from 110 baud to 9600 baud which can be selected by touching a key from 2-8, respectively. At the bottom of the screen 9a is the prompt message "ENTER NUMBER FOR DESIRED OPTION." After an entry is processed, the state index will return to 0. Strings of prompt data are used to generate screens for each of the other parameters, so that parity may be even, odd or none, so that the cursor may be on or off, and so that the other parameters may be selected according to values commonly used in the art. These screens appear when one of the other states from two to eight are entered in response to a keyboard entry by the user.

Besides providing various communication options, the ALPHANUMERIC task also processes characters to allow two-way communication between the terminal and another device over the serial channel 62, while displaying messages that are sent and received. This is done in state 0 before setting the state to a user selected value. If the microprocessor 68 detects a carriage return, it initializes the display parameters and enters state zero to process characters, before handling user inputs to change such parameters.

From this description it should be apparent how interchangeable application module 14 enables a computer terminal 1 to perform both conventional computer terminal applications and special applications such as emulating a program panel for two different types of programmable controllers. This description has included additional material concerning the application module firmware which was not available at the time of filing the patent application referred to above and which is submitted in the form of Appendices B-Q listed in Table 4 below, which includes cross-references to items represented in the drawings. The Appendices are available in microfiche as mentioned at the beginning of the specification.

TABLE 4

| Appendix | | Reference No. |
|---|---|---|
| B | Resident initialization and resident display firmware | 151 |
| C | Cold Start routines | 152 |
| D | Mode Select Task and subroutines | 163 |
| E | FAC keyboard file | |
| F | Keyboard task and keyboard utilities | 161 |
| G | CRT task and CRT utilities | 162 |
| H | PC No. 1 application task | 141 |
| I | PC No. 2 initialization routine | 142 |
| J | PC No. 2 command interpreter and system controller routine | 142 |
| K | PC No. 2 application task state processor | 142 |
| L | PC No. 2 main search actions | 142 |
| M | PC NO. 2 instruction/editing actions | 142 |
| N | PC No. 2 display firmware | 142 |
| O | PC No. 2 decode instruction routines | 142 |
| P | PC No. 2 miscellaneous actions | |
| Q | ALPHANUMERIC application task | 143 |

APPENDIX A

```
: 02000                                                               01002    :
+ -]/[- - - - - - +- - - - - - - - - - - - - - - - - - - - - - - -(L)- - +
                  :                                                      OFF
: 30100    03202  :
+ -]  [- - -]  [- +
:                                                                        :
```

APPENDIX A-continued

```
: 01002                                                            01001      :
+ -] [- - - - - - - - - - - - - - - - - - - - - - - - - - - - - --(L)-- +
                                                                   OFF
: 01002                                                            01007      :
+ -] [- - - - - - - - - - - - - - - - - - - - - - - - - - - - - --(L)-- +
                                                                   ON
: 01007   01002   01001                                            03202      :
+ -] [- - -] [- - -] [- - - - - - - - - - - - - - - - - - - - - --(U)-- +

: 01007   01002   01001                                            03100      :
+ -] [- - -] [- - -] [- - - - - - - - - - - - - - - - - - - - - --(U)-- +

: 01007   01002   01001   03000   03003                            03101      :
+ -] [- - -] [- - -] [- - -] [- - -] [- - - - - - - - - - - - - --(L)-- +
                                                                   OFF
: 03101                                                            01002      :
+ -] [- - - - - - - - - - - - - - - - - - - - - - - - - - - - - --(U)-- +

: 03101   01002                                                    01001      :
+ -] [- - -]/[- - - - - - - - - - - - - - - - - - - - - - - - - -(U)-- +

: 03101   01002   01001                                            01007      :
+ -] [- - -]/[- - -] / - - - - - - - - - - - - - - - - - - - - - --(U)-- +

: 01007   01001   01002                                            03101      :
+ -]/[- - -]/[- - -]/[- - - - - - - - - - - - - - - - - - - - - --(U)-- +

: 01000   01001   01002   01006   01007   03000   03003            03200      :
+ -]/[- - -]/[- - -]/[- - -]/[- - -]/[- - -]/[- - -]  [- - --(L)-- +
                                                                   OFF
: 03200   01007   110                                              035        :
+ -] [- - -]/[- - -[G]- - - - - - - - - - - - - - - - - - - - - -(PUT) - +
                  000                                              035       :
: 03200   03100                                                    01007      :
+ -] [- - -]/[- - - - - - - - - - - - - - - - - - - - - - - - - --(L)-- +
                                                                   ON
: 01007   03200   03000   03001   03002   03003                    03100      :
+ -] [- - -] [- - -] [- - -] [- - -] [- - -]/[- - - - - - - --(L)-- +
                                                                   OFF
: 03100   03200   110                                              036        :
+ -] [- - -] [- - -[G]- - - - - - - - - - - - - - - - - - - - - -(PUT) - +
                  000                                              080       :
: 03600                                                            03510      :
+ -] [- - - - - - - - - - - - - - - - - - - - - - - - - - - - - --( )-- +

: 03601                                                            03511      :
+ -] [- - - - - - - - - - - - - - - - - - - - - - - - - - - - - --( )-- +

: 03602                                                            01007      :
+ -] [- - - - - - - - - - - - - - - - - - - - - - - - - - - - - --( )-- +
                                                                   ON
```

The embodiments in which an exclusive property or privilege is claimed are as follows:

1. A computer terminal of the type having video display means, a processor interfaced to the video display means to couple characters thereto, keyboard interface means coupled to the processor for transmitting user inputs to the processor, and an I/O port coupled to the processor for receiving data from an external device and for transmitting data to the external device, wherein the improvement comprises:

resident memory means coupled to the processor, the resident memory means storing a first sequence of processor instructions that direct the processor in receiving character data from the I/O port and displaying characters on the video display means, and the resident memory means storing a second sequence of processor instructions that enable the processor to detect the connection of an application module; and an application module removably connected as a portion of the computer terminal and including (a) a keyboard for manually entering user application characters and other inputs, (b) first interface means electrically connected to the keyboard for providing releasable electrical connection with the keyboard interface means, (c) application memory means for storing processor instructions that enable the processor to set up user application characters for display in response to entry of such characters through the keyboard, the application memory means storing other processor instructions that enable the processor to direct the display of prompt messages on the video display means to prompt a user to select a mode of operation for the terminal, and the application memory means storing application sequences of processor instructions corresponding to available modes of operation; and (d) second interface means electrically coupled to the application memory means for providing releasable electrical connection with the processor; and wherein the operation of the processor begins under the control of processor instructions from the resident memory means, and when the processor detects the connection of the application module, the operation of the processor is switched to the control of processor instructions from the application memory means; and wherein the processor is operable in response to mode selection user inputs entered through the keyboard in response to the prompt messages to execute processor instructions stored in the application memory means in one of the application sequences that corresponds to the selected mode of terminal operation.

2. The computer terminal of claim 1, wherein:

the keyboard on the application module includes a set of removable overlays, each with a set of symbols corresponding to a respective mode of operation and further corresponding to a respective one of the application sequences in the application memory means; and wherein one of the overlays is removably mounted on the application module when that module is in use.

3. The computer terminal of claim 2, wherein:

there are at least two modes of operation; and wherein one of the application sequences of instructions stored in the application memory means is executed by the processor to organize a programmable controller user program in ladder-diagram format for display on the video display means and for transmission to a type of programmable controller connected to the I/O port on the terminal.

4. The computer terminal of claim 3, wherein a second one of the application sequences of instructions stored in the application memory means is executed by the processor to organize user programming information for transmission to a second type of programmable controller connected to the I/O port on the terminal.

5. A computer terminal for directing program loading operations for a programmable controller, the terminal comprising:

a video monitor module with a CRT display and a processor interfaced to the CRT display through video control circuitry, the video monitor module also having a serial I/O port interfaced to the processor and connectable to an external serial communication channel to process character information received and transmitted through the serial communication channel, the video monitor module also having resident memory means coupled to the processor for storing resident processor instructions, and the video monitor module also having electrical connection means coupled to the processor to interface the processor with another module; and wherein the computer terminal further comprises an intelligent full-keyboard module which is attachable and detachable from the video monitor module and which has keyboard input means for entering a full set of user keyboard inputs, the intelligent full-keyboard module also having application memory means for storing processor instructions in a plurality of application sequences, in which each application sequence is executed by the processor to recognize and interpret keyboard inputs as defining a different set of characters for each respective application sequence, and in which the serial I/O port is directed by the processor to receive and transmit the set of characters for each respective application sequence, the intelligent full-keyboard module also having electrical connection means for connection to the electrical connection means on the video monitor module to interface the keyboard input means and the application memory means to the processor, and wherein the operation of the processor begins under the control of processor instructions from the resident memory means, and after the processor detects the connection of the application module, the operation of the processor is switched to the control of processor instructions in one of the application sequences, and wherein a first one of the application sequences includes processor instructions that are executed by the processor in response to keyboard inputs to direct a program loading operation for a first type of programmable controller in which keyboard inputs are interpreted to generate programmable controller user program characters for display in ladder-diagram format on the CRT display and for communication through the serial I/O port and the external serial communication channel.

6. The computer terminal of claim 5 wherein another one of the application sequences includes processor instructions that are executed by the processor in response to keyboard inputs to direct a program loading operation for a second type of programmable controller.

7. The computer terminal of claim 5, wherein the video monitor module has a second serial I/O port interfaced to processor, and wherein another one of the application sequences includes processor instructions that are executed by the processor in response to keyboard inputs for two-way communication of alphanumeric characters through the second serial I/O port and a second external serial communication channel connected to the second serial I/O port.

8. The computer terminal of claim 5, wherein the application memory means also stores further sequences of processor instructions and an executive program that are executed by the processor to enable the application sequences of instructions on the intelligent keyboard module to direct operation of the CRT display and the serial I/O port in the video monitor module in corresponding modes of terminal operation.

9. A computer terminal of the type having video display means, a processor interfaced to the video display means to couple characters thereto, keyboard interface means coupled to the processor for transmitting user inputs to the processor, and an I/O port coupled to the processor for receiving data from an external device and for transmitting data to the external device, wherein the improvement comprises:

resident memory means coupled to the processor for storing resident processor instructions that enable the processor to detect the connection of another module; and an intelligent keyboard module removably connected as a portion of the computer terminal and including full keyboard input means for manually entering user application characters and all other keyboard inputs, the full keyboard inputs means including a blank keyboard and a plurality of overlays each adapted to be disposed over the blank keyboard to provide symbols for respective keys, means electrically connected to the full keyboard input means for providing releasable electrical connection with the keyboard interface means, application memory means for storing processor instructions that enable the processor to set up user application characters for display in response to keyboard inputs, and means electrically coupled to the application memory means for providing releasable electrical connection with the processor;

wherein the operation of the processor begins under the control of processor instructions from the resident memory means, and when the processor detects the connection of the intelligent keyboard module, the operation of the processor is switched to the control of processor instructions from the application memory means; and wherein the processor instructions are organized in application sequences, in which each application sequence is associated with a respective overlay and in which each application sequence is executed by the processor to recognize and interpret keyboard inputs according to the symbols on the overlay associated with the respective application sequence.

10. The computer terminal of claim 9, wherein:

the application memory means stores processor instructions that are organized in two application sequences for execution by the processor in response to keyboard inputs to generate user application instructions for two respective types of programmable controllers, to cause display of the user application instructions for the respective types of programmable controllers on the video display means, and to communicate user application instructions for the respective types of programmable controllers through the I/O port.

11. The computer terminal of claim 9 wherein:

the application memory means stores processor instructions that are organized in two application sequences including a first application sequence for directing a programmable controller program loading operation and a second sequence for two-way communication of alphanumeric characters through the I/O port; and wherein the plurality of overlays includes a first overlay with programmable controller programming symbols for use during execution of the first application sequence and a second overlay with a full set of alphanumeric symbols for use during execution of the second application sequence.

* * * * *

UNITED STATES PATENT AND TRADEMARK OFFICE
CERTIFICATE OF CORRECTION

PATENT NO. : 4,527,250

DATED : July 2, 1985

Page 1 of 5

INVENTOR(S) : Daniel J. Galdun, Odo J. Struger, Valdis Grants, and Ronald A. Brown It is certified that error appears in the above-identified patent and that said Letters Patent is hereby corrected as shown below:

| | |
|---|---|
| Column 2, line 6 | "I/O" should be --I/O-- (plain text) |
| Column 2, line 7 | "I/O" should be --I/O-- (plain text) |
| Column 3, line 33 | after "application module" insert --which-- |
| Column 3, line 42 | "10c" should be --10c--(number boldface) |
| Column 4, line 13 | "1a" should be --1a-- (number boldface) |
| Column 5, line 10 | "I/0" should be --I/O-- |
| Column 5, line 11 | "I/0" should be --I/O-- |
| Column 5, line 25 | "1a" should be --1a-- (number boldface) |
| Column 5, line 33 | "A11" should be --A11-- (number boldface) |
| Column 5, line 55 | "A11" should be --A11-- (number boldface) |
| Column 5, line 64 | "1a" should be --1a-- (number boldface) |
| Column 6, line 15 | "I/0 1-I/0" should be --I/O 1-I/O-- |
| Column 6, line 26 | "53 to second" should be --53 to a second-- |
| Column 6, line 46 | "A11" should be --A11-- (boldface) |
| Column 6, line 51 | "A11" should be --A11-- (boldface) |
| Column 6, line 51 | "A1" should be --A13-- |

UNITED STATES PATENT AND TRADEMARK OFFICE
CERTIFICATE OF CORRECTION

PATENT NO. : 4,527,250

DATED : July 2, 1985

INVENTOR(S) : Daniel J. Galdun, Odo J. Struger, Valdis Grants, and Ronald A. Brown It is certified that error appears in the above-identified patent and that said Letters Patent is hereby corrected as shown below:

| | |
|---|---|
| Column 6, line 52 | "3" should be deleted |
| Column 6, line 63 | "I/0" should be --I/O-- |
| Column 6, line 64 | "I/0" should be --I/O-- |
| Column 6, line 65 | "I/0" should be --I/O-- |
| Column 6, line 66 | "I/0" should be --I/O-- |
| Column 7, line 1 | "I/0" should be --I/O-- |
| Column 7, line 2 | "I/0" should be --I/O-- |
| Column 7, line 11 | "I/0" should be --I/O-- |
| Column 7, line 36 | "Ml" should be --M1-- |
| Column 7, line 40 | "I/0" should be --I/O-- |
| Column 7, line 41 | "I/0" should be --I/O-- |
| Column 7, line 47 | "Ml" should be --M1-- |
| Column 8, line 4 | "Ml" should be --M1-- |
| Column 8, line 23 | "(serial I/0)" should be --(serial I/O)-- |
| Column 8, line 44 | "Ml" should be --M1-- |
| Column 8, line 63 | "Al" should be --A1-- |

UNITED STATES PATENT AND TRADEMARK OFFICE
CERTIFICATE OF CORRECTION

PATENT NO. : 4,527,250

DATED : July 2, 1985

INVENTOR(S) : Daniel J. Galdun, Odo J. Struger, Valdis Grants, and Ronald A. Brown It is certified that error appears in the above-identified patent and that said Letters Patent is hereby corrected as shown below:

Column 9, line 7     " A1 and A0" should be --A1 and A1--

Column 9, line 10     "Control data" should be --control/data--

Column 9, line 42     "I/0" should be --I/O--

Column 9, line 49     "I/0" should be --I/O--

Column 9, line 55     "I/0" should be --I/O--

Column 9, line 65     "I/0" should be --I/O--

Column 10, lines 15 & 16     "I/0" should be --I/O--

Column 10, lines 30 & 33     All number 1's should be boldface

Column 10, line 36     "A1" should be --A1--

Column 10, line 44     "PA1" should be -- PA1 --.

Column 11, line 49,     "CE1" should be -- CE1 --.

UNITED STATES PATENT AND TRADEMARK OFFICE
CERTIFICATE OF CORRECTION

PATENT NO. : 4,527,250

DATED : July 2, 1985

INVENTOR(S) : Daniel J. Galdun, Odo J. Struger, Valdis Grants, and Ronald A. Brown It is certified that error appears in the above-identified patent and that said Letters Patent is hereby corrected as shown below:

| | | |
|---|---|---|
| Column 13, line 17 | "50 /90 /120" should be --50/90/120-- |
| Column 13, line 32 | "O FFF" should be --OFFF-- |
| Column 15, lines 63 & 64 | "exeoutes" should be --executes-- |
| Column 17, line 55 | "included in the Appendix" should be --included in Appendix-- |
| Column 18, line 66 | "Remote selection or run" should be --Remote selection of run-- |
| Column 19, lines 6 & 7 | "bond rate" should be --baud rate-- |
| Column 19, lines 8 & 9 | "Contact hstogram" should be --Contact histogram -- |
| Column 20, line 50 | "99F6" should be 00F6-- |
| Column 21, line 1 | "THE FELAGS" should be --THE FLAGS-- |
| Column 22, line 34 | "E!A-O-E!A-99" should be --E!A0-E!A-99-- |
| Column 27, line 30 | Bracket missing under the 01001, should be --]/[-- |

UNITED STATES PATENT AND TRADEMARK OFFICE
CERTIFICATE OF CORRECTION

PATENT NO. : 4,527,250

DATED : July 2, 1985

Page 5 of 5

INVENTOR(S) : Daniel J. Galdun, Odo J. Struger, Valdis Grants, and Ronald A. Brown It is certified that error appears in the above-identified patent and that said Letters Patent is hereby corrected as shown below:

Column 27, line 40    under (PUT), "035" should be --000--

Column 27, line 56    Reference no. "01007" should be --03512--

Signed and Sealed this

Twenty-sixth Day of November 1985

[SEAL]

Attest:

DONALD J. QUIGG

Attesting Officer     Commissioner of Patents and Trademarks